US012237789B2

(12) United States Patent
Bando et al.

(10) Patent No.: US 12,237,789 B2
(45) Date of Patent: Feb. 25, 2025

(54) MODULAR MULTILEVEL CONVERTER AND MODULAR MULTILEVEL CONVERTER SYSTEM

(71) Applicants: HITACHI MITSUBISHI HYDRO CORPORATION, Tokyo (JP); TAMURA CORPORATION, Tokyo (JP)

(72) Inventors: Akira Bando, Tokyo (JP); Takahiko Kikui, Tokyo (JP); Francesco Chilosi, Tokyo (JP); Silvio Resteghini, Tokyo (JP)

(73) Assignees: HITACHI MITSUBISHI HYDRO CORPORATION, Tokyo (JP); TAMURA CORPORATION, Tokyo (JP)

( * ) Notice: Subject to any disclaimer, the term of this patent is extended or adjusted under 35 U.S.C. 154(b) by 17 days.

(21) Appl. No.: 17/913,819

(22) PCT Filed: Aug. 24, 2020

(86) PCT No.: PCT/JP2020/031899
§ 371 (c)(1),
(2) Date: Mar. 29, 2023

(87) PCT Pub. No.: WO2022/044091
PCT Pub. Date: Mar. 3, 2022

(65) Prior Publication Data
US 2024/0243681 A1 Jul. 18, 2024

(51) Int. Cl.
H02M 5/458 (2006.01)
H02P 27/06 (2006.01)
(52) U.S. Cl.
CPC .................................. H02P 27/06 (2013.01)

(58) Field of Classification Search
CPC ........ H02P 27/06; H02M 1/0064; H02M 1/126; H02M 1/14
See application file for complete search history.

(56) References Cited

U.S. PATENT DOCUMENTS 4,531,108 A 7/1985 Brandes
2008/0174255 A1 7/2008 Schnetzka et al.
(Continued)

FOREIGN PATENT DOCUMENTS

EP 0117460 A1 9/1984
JP 5189105 B2 4/2013
(Continued)

OTHER PUBLICATIONS

Extended European Search Report dated Apr. 8, 2024, from corresponding EP application No. 20951347.2, 13 pages.
Shen et al., "Influence of Two-Stage Coupled Arm Inductors on Modular Multilevel Converter", IEEE Access, vol. 7, 2019, 12 pages.
Saeed et al., "Design and construction of a DAB using SiC MOSFETs with an isolation of 24 kV for PET applications", EPE'17 ECCE Europe, 2017, 10 pages.
(Continued)

Primary Examiner — Muhammad S Islam
(74) Attorney, Agent, or Firm — Rimon P.C.

(57) ABSTRACT

An MMC converter includes three units of two-terminal arms on a P-terminal side, and three units of two-terminal arms on an N-terminal side. An inductive element between the arms on the P-terminal side and the arms on the N-terminal side includes a reactor provided with a UP coil and a UN coil concentrically wound around an iron-core leg, a reactor provided with a VP coil and a VN coil concentrically wound around an iron-core leg, and a reactor provided with a WP coil and a WN coil concentrically wound around an iron-core leg. Each of the coils is wound around in a direction such that the iron-core legs are excited by a flow-through current from the N terminal to the P terminal.

3 Claims, 18 Drawing Sheets

(56) References Cited

U.S. PATENT DOCUMENTS

| | | | |
|---|---|---|---|
| 2010/0118578 A1 | 5/2010 | Dommaschk et al. | |
| 2011/0103106 A1* | 5/2011 | Sato | H02M 5/4585 |
| | | | 363/37 |
| 2015/0008859 A1 | 1/2015 | Inoue et al. | |
| 2015/0123479 A1* | 5/2015 | Kurita | H01F 37/00 |
| | | | 363/40 |
| 2015/0124506 A1 | 5/2015 | Sahoo et al. | |
| 2015/0380147 A1* | 12/2015 | Takano | H02J 3/01 |
| | | | 333/185 |
| 2016/0056667 A1 | 2/2016 | Konishi et al. | |
| 2018/0034399 A1 | 2/2018 | Bando et al. | |
| 2020/0144949 A1 | 5/2020 | Bando et al. | |
| 2021/0211054 A1* | 7/2021 | Kawamura | H02M 3/1584 |
| 2022/0263424 A1* | 8/2022 | Tahata | H02M 1/0064 |

FOREIGN PATENT DOCUMENTS

| | | |
|---|---|---|
| JP | 2015-12769 A | 1/2015 |
| JP | 6243083 B2 | 12/2017 |
| JP | 2019-140743 A | 8/2019 |

OTHER PUBLICATIONS

Kucka et al., "Modular Multilevel Converter With Magnetically Coupled Branch Inductors", IEEE Transactions on Power Electronics, vol. 32, No. 9, Sep. 2017, 11 pages.

International Search Report Issued in corresponding International Patent Application No. PCT/JP2020/031899, filed Oct. 27, 2020, with English translation.

* cited by examiner

FIG.6
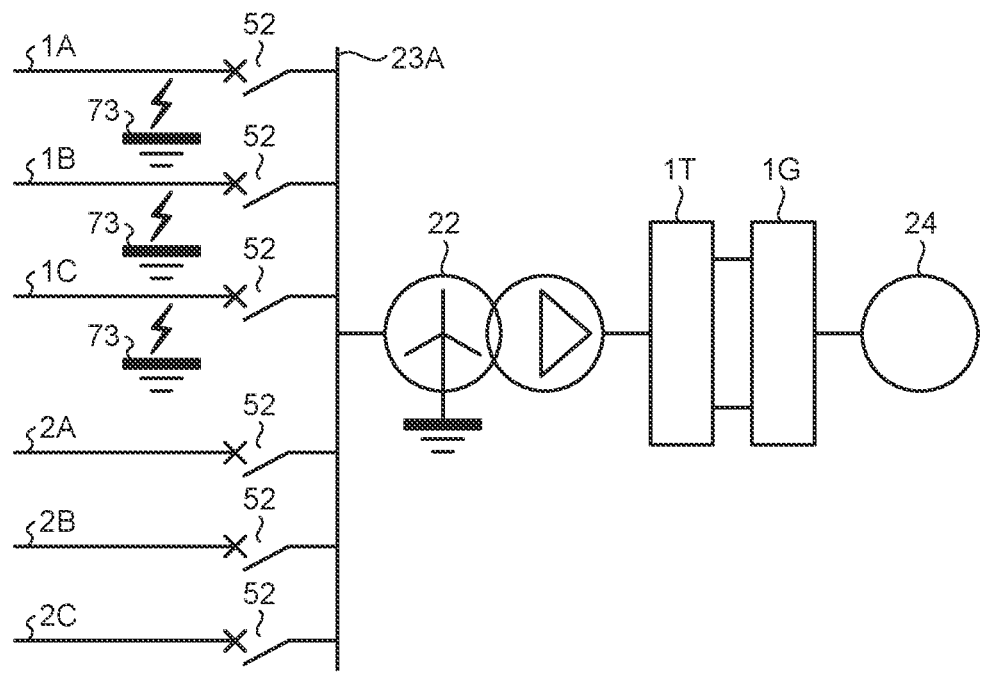
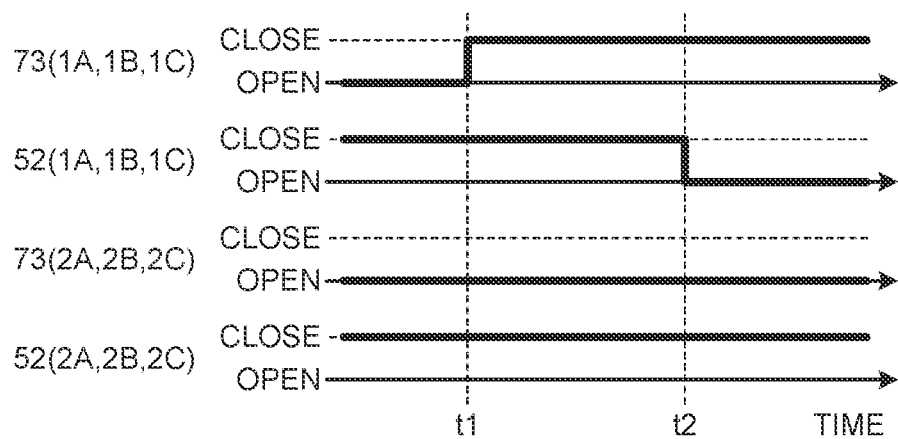

FIG.7
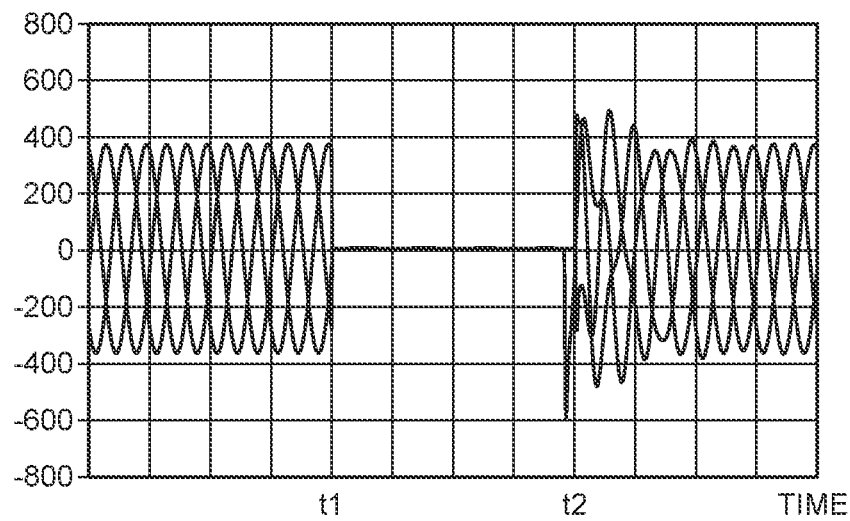
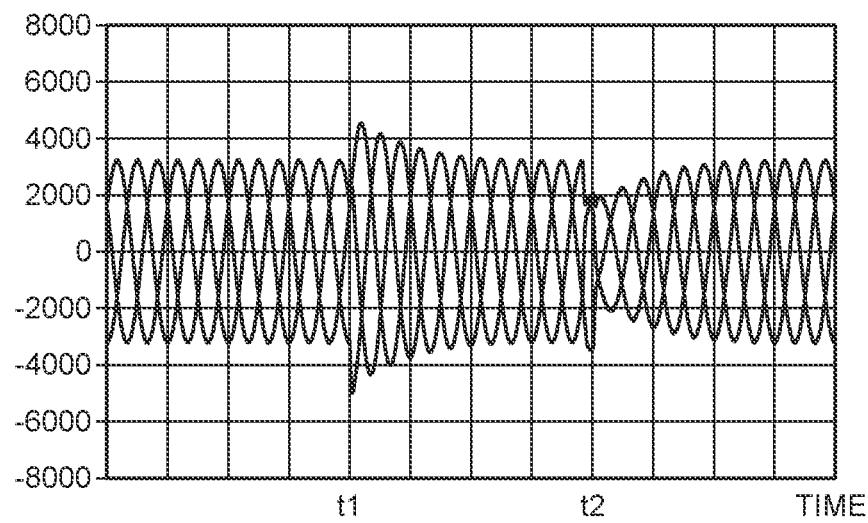

FIG.8
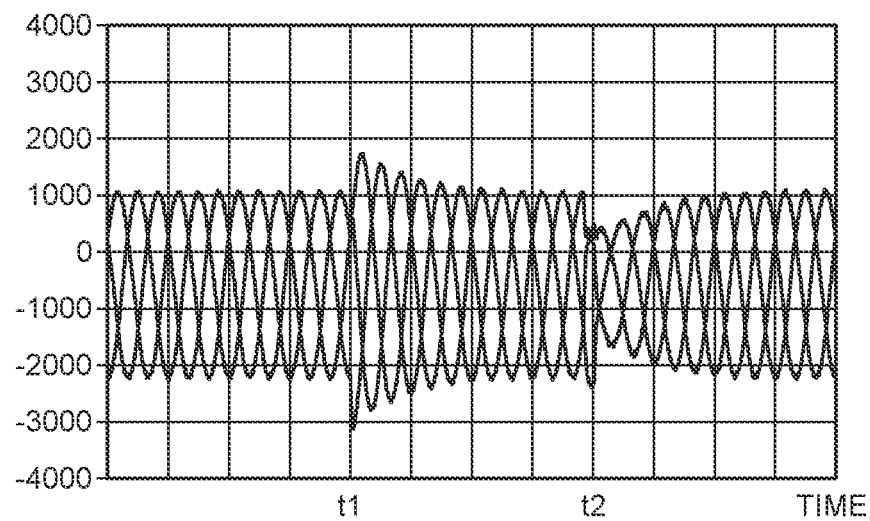
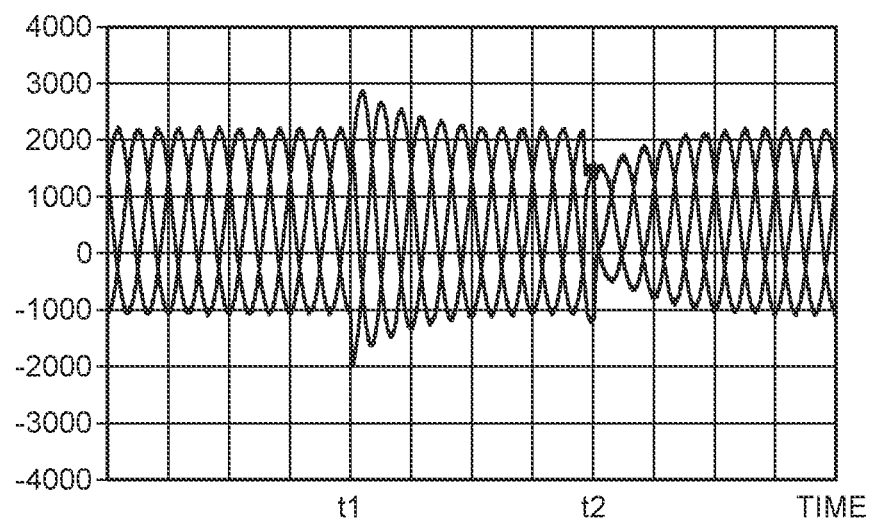

FIG.9
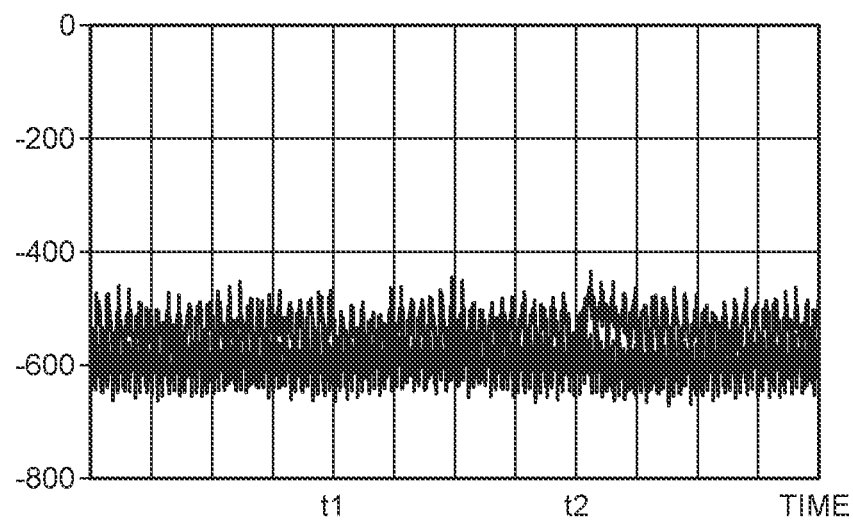
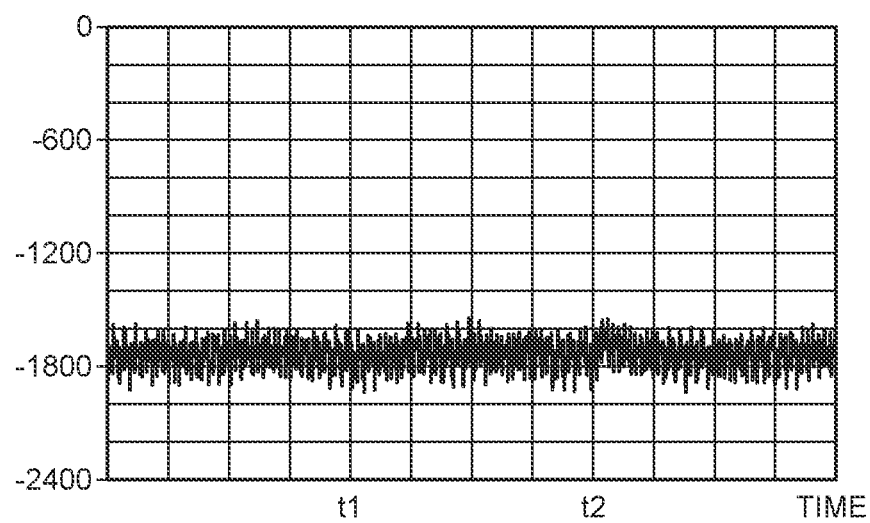

FIG.10
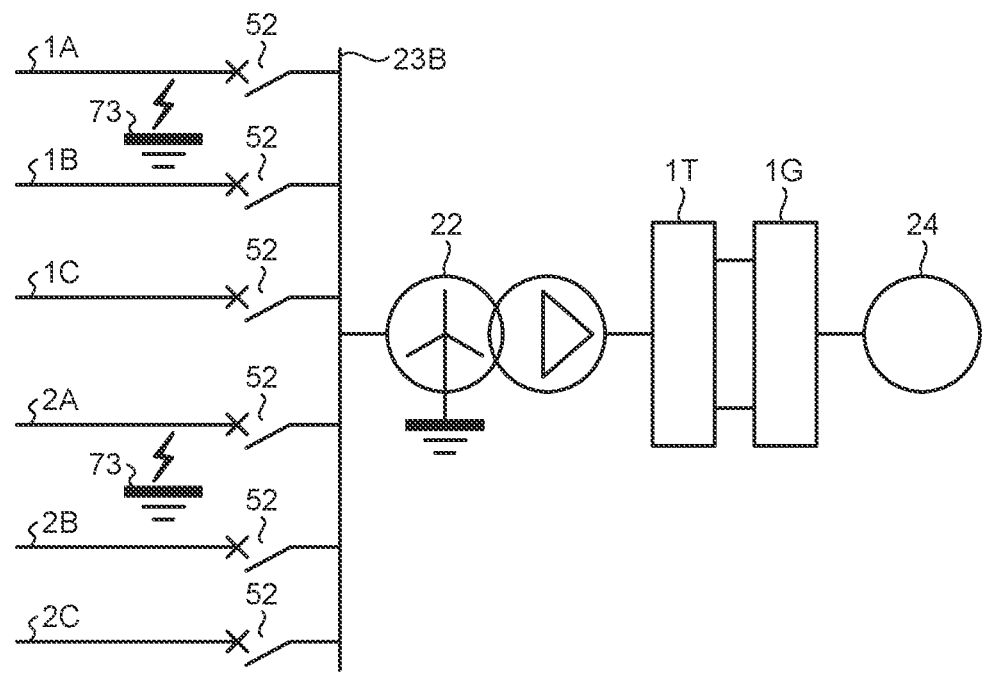
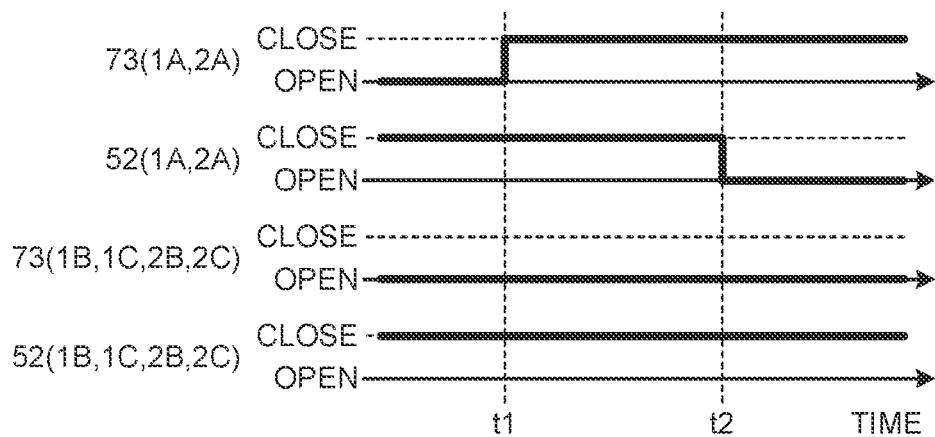

FIG.11
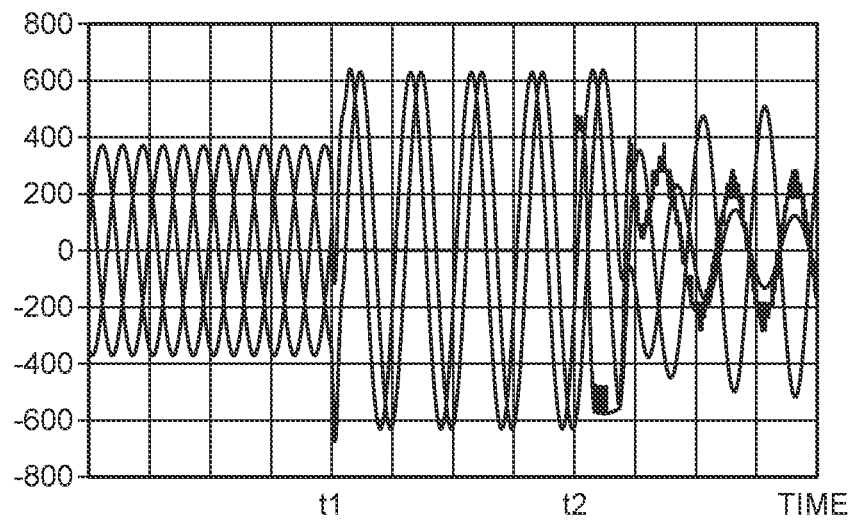
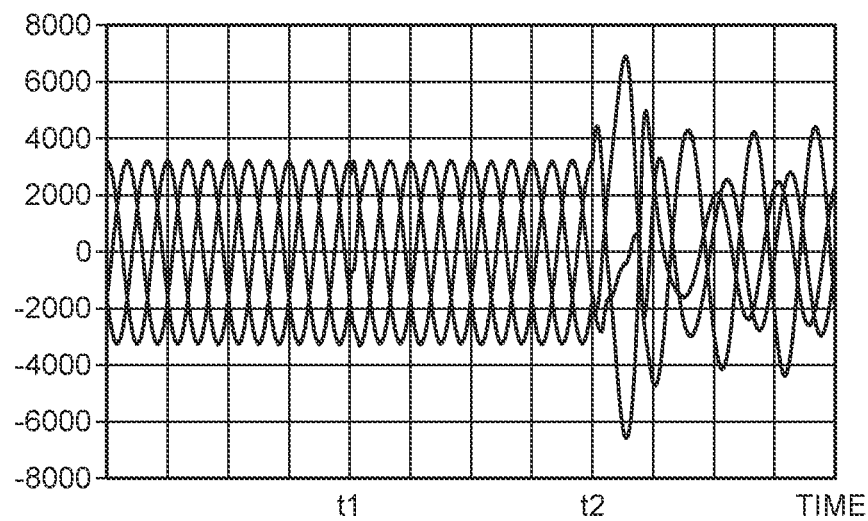

FIG.12
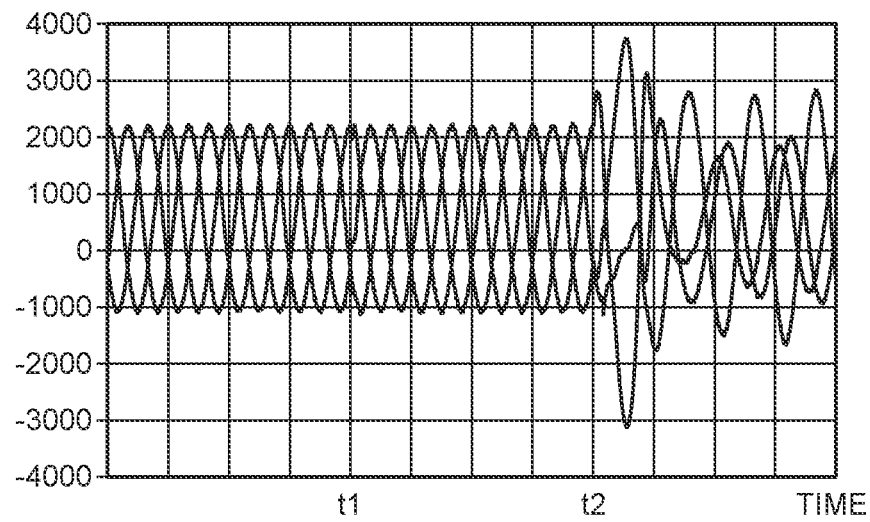
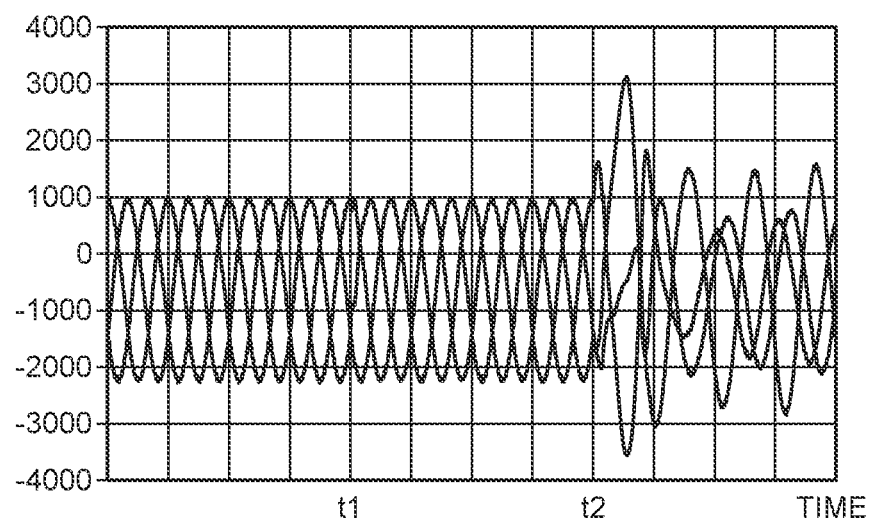

FIG.13
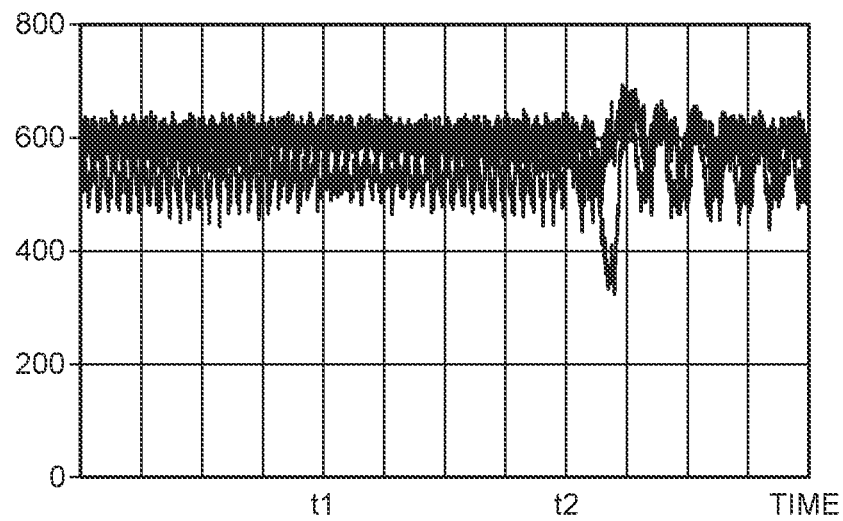
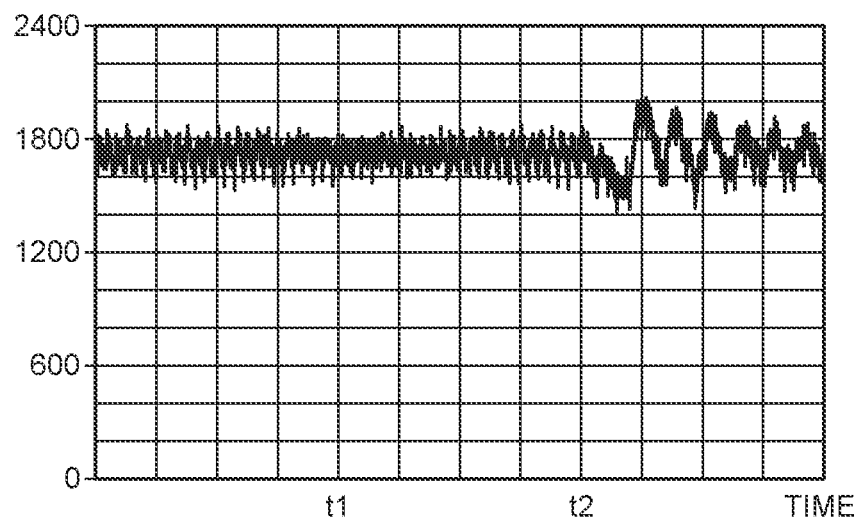

MODULAR MULTILEVEL CONVERTER AND MODULAR MULTILEVEL CONVERTER SYSTEM

CROSS-REFERENCE OF RELATED APPLICATIONS

This application is the U.S. National Phase under 35 U.S.C. § 371 of International Patent Application No. PCT/JP2020/031899, filed on Aug. 24, 2020, the entire disclosure of which Application is incorporated by reference herein.

FIELD

The present invention relates to a modular multilevel converter (hereinafter, "MMC converter" in the present invention). The present invention relates more particularly to a modular multilevel converter system preferable to constitute a frequency conversion device by connecting two MMC converters back to back on their DC sides, and to constitute a variable-speed generator-motor device by connecting one of the MMC converters on its AC side to a power system, and connecting the other MMC converter on its AC side to an AC electric rotating machine.

BACKGROUND

A circuit of an MMC converter is formed of a unit converter that generates a required voltage by controlling the modulation factor of a PWM converter using an energy storage element with voltage source properties, such as a capacitor, as a voltage source. The voltage of the energy storage element in the unit converter fluctuates by charging/discharging in a cycle determined by an AC frequency. Six units of two-terminal arms are provided, in each of which the unit converters are connected in series. Three of the two-terminal arms are used as a positive-side arm. First terminals of the positive-side arm are connected to terminals for respective phases of an AC power supply, while second terminals in star connection are connected to a positive-side terminal of a DC power supply. The other three of the two-terminal arms are used as a negative-side arm. Second terminals of the negative-side arm are connected to the terminals for respective phases of the AC power supply, while first terminals in star connection are connected to a negative-side terminal of the DC power supply.

Control by the MMC converter includes a current control to adjust an arm current to an AC current command and a DC current command issued externally (hereinafter, "converter current control" in the present invention), a function of maintaining a balanced average voltage of the energy storage elements between the unit converters by simultaneously adjusting the modulation factors of the PWM converters provided in the unit converters in the arm (hereinafter, "interstage control" in the present invention), a function of maintaining a balanced average voltage of the energy storage elements in the arm between the arms (hereinafter, "interphase balance control" in the present invention), and a function of maintaining an average voltage of all the energy storage elements at a set value (hereinafter, "DC voltage control" in the present invention). In order to implement the interphase balance control and the DC voltage control described above, an inductive element is needed. The inductive element reduces a current flowing from the negative-side arm to the positive-side arm for each phase (hereinafter, "flow-through current" in the present invention).

Patent Literature 1 discloses a system in which, in order to reduce the above flow-through current, three units of two-terminal reactors are provided between a positive-side terminal of a DC power supply and AC power supply terminals for respective phases, and three units of two-terminal reactors are provided between a negative-side terminal of the DC power supply and the AC power supply terminals for respective phases.

Patent Literature 2 discloses a circuit system in which one unit of three-terminal reactor is provided instead of the two units of the two-terminal reactors connected to each of the AC power supply terminals for respective phases in Patent Literature 1, and magnetomotive forces of two windings are subtracted from each other for an AC current, while magnetomotive forces of the two windings are added together for a flow-through current.

CITATION LIST

Patent Literatures

Patent Literature 1: Japanese Patent No. 5189105
Patent Literature 2: Japanese Patent No. 6243083

SUMMARY

Technical Problem

A configuration of an MMC converter 28 using two-terminal reactors in Patent Literature 1 is illustrated in FIG. 14. Three units of two-terminal positive-side arms 7P are provided between AC terminals U, V, and W of the MMC converter 28 and a positive-side DC terminal P thereof. Three units of two-terminal negative-side arms 7N are provided between the AC terminals U, V, and W and a negative-side DC terminal N. Current transformers 10 are provided between the AC terminals U, V, and W and first terminals of the positive-side arms 7P, and also provided between the AC terminals U, V, and W and second terminals of the negative-side arms 7N. Three units of two-terminal reactors 29P are provided between the positive-side DC terminal P of the MMC converter 28 and second terminals of the positive-side arms 7P. Three units of two-terminal reactors 29N are provided between the negative-side DC terminal N of the MMC converter 28 and first terminals of the negative-side arms 7N.

In the configuration described above, currents detected by the current transformers 10 (IP_U, IP_V, IP_W, IN_U, IN_V, and IN_W) are input to a converter-current control device 11, and the converter-current control device 11 computes AC currents (IAC_U, IAC_V, and IAC_W) and flow-through currents for respective phases (IPN_U, IPN_V, and IPN_W) flowing from the negative-side arms 7N to the positive-side arms 7P by using the following equations.

$$IAC\_U = IP\_U + IN\_U$$
$$IAC\_V = IP\_V + IN\_V$$
$$IAC\_W = IP\_W + IN\_W$$
$$IPN\_U = (1/2) \times (IP\_U - IN\_U)$$
$$IPN\_V = (1/2) \times (IP\_V - IN\_V)$$
$$IPN\_W = (1/2) \times (IP\_W - IN\_W)$$

These AC currents and flow-through currents are input to output a gate pulse to the two-terminal arms, the positive-side arms 7P and the negative-side arms 7N.

Conventionally, an air-core reactor has been employed as the two-terminal reactors 29P and 29N of the MMC converter 28. An iron-core reactor is effective to downsize the device. However, the iron-core reactor has not been employed because, as the inductance decreases due to iron-core saturation, the AC current and the flow-through current both increase in inverse proportion to the inductance. The air-core reactor has a larger-size body compared to the iron-core reactor. In addition, there is a possibility for the air-core reactor to cause electromagnetic interference with the surroundings due to flux leakage. For these reasons, the reactors are often installed in a shield chamber. This leads to a problem with a further increase in the size of the facilities.

As the inductance value is increased to reduce the flow-through current, this increases an AC voltage drop which is determined by the product of this inductance value and the AC current. Particularly when reactive power is supplied to the AC-side, it is necessary to increase an output voltage of the arms (the positive-side arms 7P and the negative-side arms 7N) in order to compensate for the AC voltage drop. This leads to a problem with a further increase in the device size.

A configuration of an MMC converter 30 using three-terminal reactors in Patent Literature 2 is illustrated in FIG. 15. Constituent elements common between the MMC converter 30 and the MMC converter 28 illustrated in FIG. 14 are denoted by like reference signs. Descriptions of the constituent elements denoted by the like reference signs as those illustrated in FIG. 14 are omitted to avoid redundant explanations.

Three-terminal reactors 31U, 31V, and 31W are provided between AC terminals (U, V, and W) for respective phases, first terminals of the positive-side arms 7P, and second terminals of the negative-side arms 7N. The AC terminals (U, V, and W) for respective phases are connected to intermediate terminals (UC, VC, and WC) of three-terminal reactors 31 (31U, 31V, and 31W). First terminals of three units of positive-side arms 7P are connected to positive-side terminals (UP, VP, and WP) of the three-terminal reactors 31. Second terminals of three units of negative-side arms 7N are connected to negative-side terminals (UN, VN, and WN) of the three-terminal reactors 31.

A configuration of the three-terminal reactor 31 is illustrated in FIG. 16. The three-terminal reactor 31 includes a winding (a reactor coil) 33 and a winding 34 that are magnetically coupled with each other by an iron core 35. The iron core 35 is provided with a plurality of magnetic gaps 36 of a non-magnetic material in order to reduce the effect of iron-core saturation.

The winding 33 and the winding 34 are of a series two-row coil configuration that is the same as that of a core-type two-terminal DC reactor between a positive-side P terminal and a negative-side N terminal. A connection point of the two windings 33 and 34 is led out as an intermediate terminal C to serve as a third terminal.

In view of this configuration, the conventional two-terminal DC reactor has been expected to be also used as a three-terminal reactor with a minimum change. Use of the three-terminal reactor 31 with an iron core has been expected to downsize the device relative to use of the two-terminal reactors 29 (29P and 29N) that are air-core reactors. A voltage drop due to an AC current is equivalent to the leakage inductance between two windings. Thus, it has been expected that an increase in the arm output voltage can be prevented.

However, when an MMC converter employs the three-terminal reactor 31 in which the intermediate terminal is led out from the two-terminal DC reactor, the following problems arise.

An AC current divided from the terminal C of the three-terminal reactor 31 illustrated in FIG. 16 into two to the terminal P and the terminal N magnetizes the iron core 35 by passing through the windings 33 and 34. The AC current flowing through the two windings is applied in a demagnetization direction, and consequently the value of mean magnetomotive force on an iron-core magnetic path (M1→M2→M3→M4→M1) becomes zero. However, the magnetic field distribution does not show a zero magnetic field. An AC magnetic field between iron-core magnetic paths M2 and M3 illustrated in FIG. 16 becomes a peak value on the positive side or the negative side. An AC magnetic field between the iron-core magnetic paths M4 and M1 becomes a peak value on the negative side or the positive side with the opposite polarity to the AC magnetic field between the iron-core magnetic paths M2 and M3.

In a case where the three-terminal reactor 31 is employed in an MMC converter, an absolute value of a peak value of alternating magnetomotive force produced by an AC current is always larger than a magnetomotive force with a uniform polarity by a flow-through current flowing through each winding. The reasons for this are described hereinafter with reference to FIGS. 17, 18, and 19.

A circuit of a unit converter that constitutes each of the arms 7 (the positive-side arms 7P and the negative-side arms 7N) is illustrated in FIG. 17. The unit converter has a configuration in which a half-bridge circuit is connected to a capacitor. The half-bridge circuit is formed of two self-arc-extinguishing elements, each of which is provided with a so called fly-wheeling diode or an inverse parallel diode. A gate signal GH output to the upper self-arc-extinguishing element, and a gate signal GL output to the lower self-arc-extinguishing element are alternately turned on and off so as to control an output voltage Vb of the unit converter to a required value. In a case of an MMC converter, a current flowing into the half-bridge circuit is represented as the sum of an AC fundamental component Ib (a peak value) and a DC component Id, excluding harmonic components. A capacitor voltage Vc fluctuates due to charging/discharging that is controlled by the AC fundamental component and the gate signals GH and GL. The fluctuation frequency is twice as high as an AC fundamental frequency. For simplicity, the capacitor voltage Vc is assumed to be constant in the descriptions below (infinite capacity of the capacitor).

A PWM control method for a unit converter is described below with reference to FIG. 18.

"α" in the upper diagram in FIG. 18 represents a modulation factor. The gate signals GH and GL are turned on and off in accordance with a magnitude relation between a carrier and a modulation wave that fluctuate between the modulation factors of 0 and 1. For simplicity, descriptions will be made below assuming that a dead time needed for the gate signals GH and GL can be made zero. Then, the gate signals GH and GL show waveforms illustrated in the middle diagram in FIG. 18. As illustrated in the bottom diagram in FIGS. 18, the output voltage Vb of the unit converter becomes equal to the capacitor voltage Vc when the gate signal GH is turned on, and becomes zero when the gate signal GL is turned on.

FIG. 19 illustrate the output voltage Vb of the unit converter, assuming that a PWM frequency that is a frequency of the carrier is infinite for simplicity, the likelihood of the actual modulation factor needed is ignored for simplicity, and the unit converter is operable with the modulation factor "α" between the lower limit of "0" and the upper limit of "1". At this time, an AC component of the output voltage Vb of the unit converter is maximized. In other words, a required AC voltage can be output from the minimum capacitor voltage Vc. Required active power is converted on the conditions that the DC voltage is minimum and the DC current is maximum.

In a case where an AC current becomes minimized and a DC current becomes maximized, the magnitude of current is compared between the DC current and the AC current in the unit converter. As illustrated in the bottom diagram in FIGS. 19, where a peak value of an AC component of the output voltage Vb of the unit converter is represented as Vb_ac, and a DC component of the output voltage Vb is represented as Vb_dc, then the following equation (1) holds.

[Equation 1]

$$Vb\_ac = (1/2) \times Vc \quad (1)$$

$$Vb\_dc = (1/2) \times Vc$$

Where the number of unit converters connected in series to constitute the arm 7 is represented as N, an AC output phase-voltage peak value Vac_phase and an AC output current peak value IAC of the MMC converter are calculated by the following equation (2). The coefficient "2" in the equation to calculate the AC output current peak value IAC is derived from the sum of the arms, that is, the positive-side arm 7 and the negative-side arm 7N.

[Equation 2]

$$Vac\_phase = N \times Vb\_ac = (1/2) \times N \times Vc \quad (2)$$

$$IAC = 2 \times Ib$$

A DC voltage VDC of the MMC converter is equal to a total DC voltage of the positive-side arm 7P and the negative-side arm 7N. A DC current IDC of the MMC converter is equal to a total DC current of three units of positive-side arms 7P or a total DC current of three units of negative-side arms 7N. Thus, the following equation (3) holds.

[Equation 3]

$$VDC = 2 \times N \times Vb\_dc = N \times Vc \quad (3)$$

$$IDC = 3 \times Id$$

For simplicity, when loss of the MMC converter is ignored, and the balance of active power on the condition that the power factor is 1 at which an AC current is minimized, is considered, then the following equation (4) holds.

[Equation 4]

$$P = VDC \times IDC = N \times Vc \times 3 \times Id = 3 \times N \times Vc \times Id \quad (4)$$

$$P = 3 \times \frac{1}{\sqrt{2}} Vac\_phase \times \frac{1}{\sqrt{2}} IAC =$$

$$1.5 \times \{(1/2) \times N \times Vc\} \times (2 \times Ib) = 1.5 \times N \times Vc \times Ib$$

In view of the above, the relation between the peak value Ib of an AC current and the DC current Id flowing through the arms 7 is expressed as the following equation (5).

[Equation 5]

$$Ib \geq 2 \times Id \quad (5)$$

As described above, an AC-component peak value of a magnetomotive force is twice or more as large as a DC-component magnetomotive force. Therefore, a peak value of a magnetomotive force of the three-terminal reactor 31 is one-third or less of a peak value of a magnetomotive force of the two-terminal reactor 29. It has been found that in contrast, when the three-terminal reactor 31 is employed in the MMC converter 30, the three-terminal reactor 31 being formed of the windings 33 and 34 and a core-type iron core 35, and being designed on the assumption that an AC-current magnetomotive force is smaller than a magnetomotive force produced by a DC current, then there is a problem that excessive iron loss due to a stray flux, and excessive copper loss due to an eddy current (coil current loss) both occur.

A three-terminal reactor 37 with a structure in which an intermediate terminal of a two-terminal reactor using a shell-type iron core is led out is illustrated in FIG. 20. A coil is divided into two windings 39 and 40 from which the intermediate terminal C is led out. The windings 39 and 40 are wound around an iron core 38. A plurality of gaps 41 of a non-magnetic material are provided to reduce the influence of magnetic saturation. Iron cores 42 and 43 form a return path through which a return flux passes.

It has been found that even when the three-terminal reactor 37 with the shell-type iron core described above is applied to the MMC converter, the positive-side winding and the negative-side winding are located in a distributed manner on the magnetic flux path, and this still leads to a problem that excessive iron loss due to a stray flux and excessive copper loss due to an eddy current (coil current loss) both occur similarly to the core-type three-terminal reactor.

The present invention has been achieved to solve the above problems, and an object of the present invention is to provide a small-sized low-loss modular multilevel converter.

Solution to Problem

In order to achieve the above object, there is provided a reactor preferable for downsizing the modular multilevel converter by using an iron-core reactor instead of an air-core reactor, for reducing the loss generated in the modular multilevel converter, and for preventing an overcurrent by reducing iron-core saturation when a system is being affected by a ground fault at AC side.

In order to provide this reactor, a winding of a shell-type two-terminal reactor is divided concentrically into two to constitute a three-terminal reactor. A P terminal-side coil is wound around an iron core on the inner side, while an N terminal-side coil is wound around the iron core on the outer side. Conversely, the P terminal-side coil may be wound around the iron core on the outer side, and the N terminal-side coil may be wound around the iron core on the inner side. In a configuration of the three-terminal reactor, magnetomotive forces are subtracted from each other, which are produced by an AC current divided into two windings from the intermediate terminal C, and magnetomotive forces of the two windings are added together, which are produced by a flow-through current from the N-terminal to the P-terminal or the other way around.

When the winding configuration in which a winding is divided concentrically into two is employed, this results in an imbalanced leakage inductance between the outer and inner coils wound around the same iron core because a leakage inductance of the outer coil is greater than a leakage inductance of the inner coil. However, it is possible to reduce a total leakage inductance of the two windings to one-tenth or less of the effective inductance. It has been also found that because the converter-current control device 11 can control the fundamental current value to a command value, even though the imbalance rate of leakage inductance between the outer coil and the inner coil increases approximately ten-fold, an increase in the uncharacteristic harmonics due to the imbalanced leakage inductance can be suppressed to only 1% or lower.

In view of the above, abnormal loss can be prevented by providing the shell-type iron core with the inner coil and the outer coil concentrically, so that the MMC converter can be operated with a little increase in the harmonics thereof.

A flow-through current for each phase has the largest AC component at the second harmonic, and the second largest AC component at the fourth harmonic. Over half of these components are generated by charging/discharging that is essential to maintain a constant voltage of a capacitor that constitutes a unit converter. The value at the second harmonic is a value equivalent to approximately 5% of the fundamental of the arm current.

However, it has been found that zero-phase components at the second harmonic and the fourth harmonic due to this charging/discharging cancel each other out. It has been found that the other even-order harmonics can be reduced to one-third of the algebraic sum of magnetomotive forces for respective phases. It has also been found that the zero-phase component is reduced to one-half of the algebraic sum of odd-order harmonics of flow-through currents for respective phases.

In view of the above, in the MMC converter, a three-phase five-leg six-winding reactor is employed in which a fourth leg and a fifth leg are provided to form a return path for a zero-phase flux. Therefore, a further downsized, lower-loss MMC converter can be obtained as compared to the case where three units of three-terminal reactors of a shell-type two-winding configuration are provided for respective phases.

Advantageous Effects of Invention

The modular multilevel converter according to the present invention has an effect where abnormal loss, generated when two windings are located in a direction of an iron-core magnetic path, is prevented by installing a three-terminal reactor for each phase in which two windings are located concentrically around a shell-type iron core.

The modular multilevel converter according to the present invention has a further effect where the length of a connecting wire between the intermediate terminal C and two windings can be minimized by winding one of the coils in a clockwise direction and winding the other coil in a counterclockwise direction, and thus a flux leakage can be reduced, which is caused by the connecting wire extending outside the iron core parallel to the magnetic path.

The modular multilevel converter according to the present invention has a still further effect where the loss due to harmonics generated in a return path of a shell-type reactor provided for each phase is decreased by using a three-phase five-leg six-winding reactor provided with a fourth leg and a fifth leg serving as a return path for a zero-phase flux.

BRIEF DESCRIPTION OF DRAWINGS

FIG. 6 is an explanatory diagram when a symmetric accident has occurred in an AC system during operation of the modular multilevel converter system according to the third embodiment illustrated in FIG. 4 with ratings in a power generation mode.

FIG. 7 are diagrams illustrating voltage and current waveforms of a unit transformer.

FIG. 8 are diagrams illustrating arm-current waveforms of an MMC converter.

FIG. 9 are diagrams illustrating waveforms of flow-through currents and waveforms of a DC current in the MMC converter.

FIG. 10 is an explanatory diagram when an asymmetric accident has occurred in an AC system during operation of the modular multilevel converter system according to the third embodiment illustrated in FIG. 4 with ratings in a power generation mode.

FIG. 11 are diagrams illustrating voltage and current waveforms of the unit transformer.

FIG. 12 are diagrams illustrating arm-current waveforms in the MMC converter.

FIG. 13 are diagrams illustrating waveforms of flow-through currents and waveforms of a DC current in the MMC converter.

DESCRIPTION OF EMBODIMENTS

A modular multilevel converter and a modular multilevel converter system according to embodiments of the present invention will be described in detail below with reference to the accompanying drawings. The present invention is not limited to the embodiments.

First Embodiment

Figure 1:
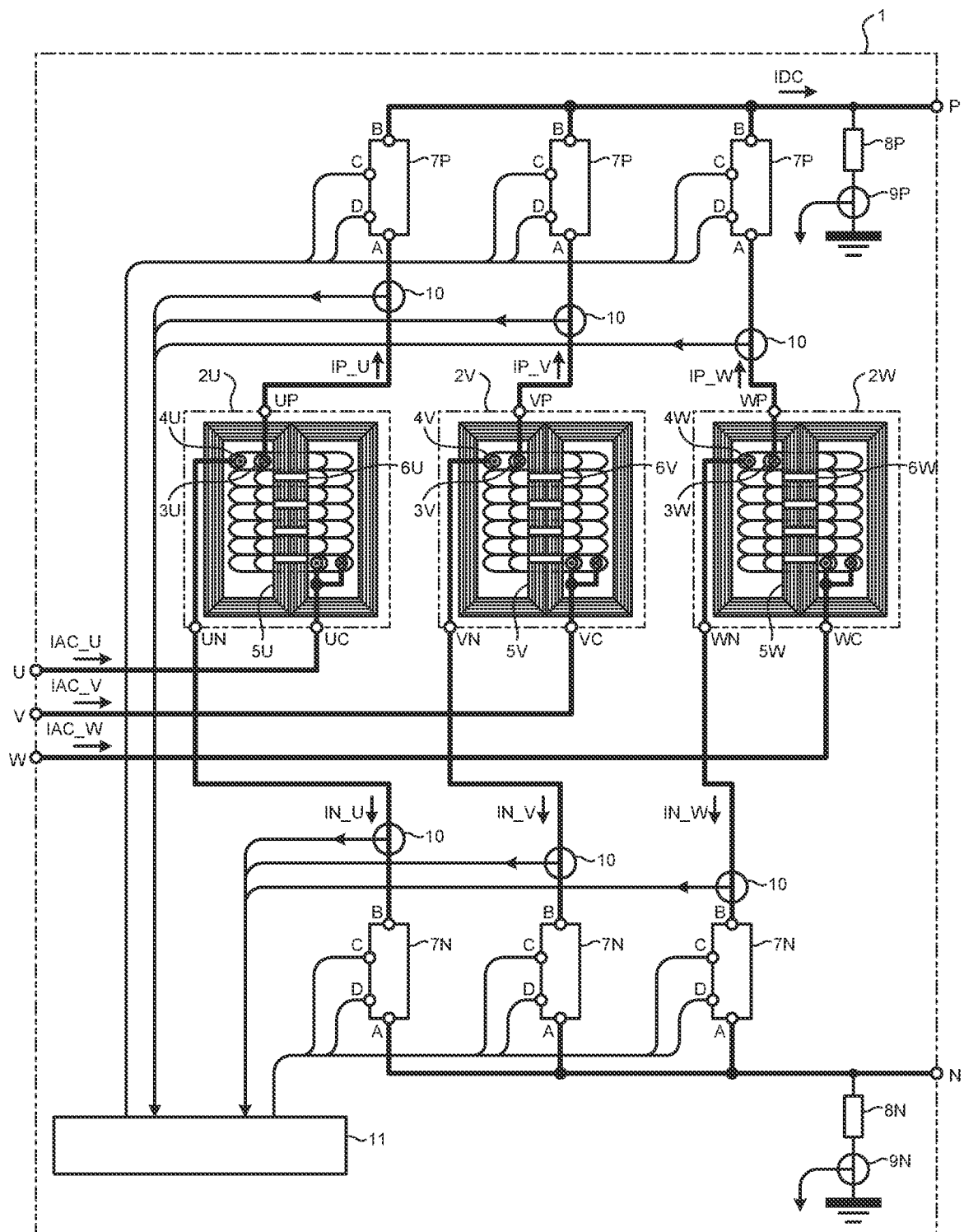
FIG. 1 is a diagram illustrating a circuit configuration of a modular multilevel converter according to a first embodiment of the present invention.
Figure 14:
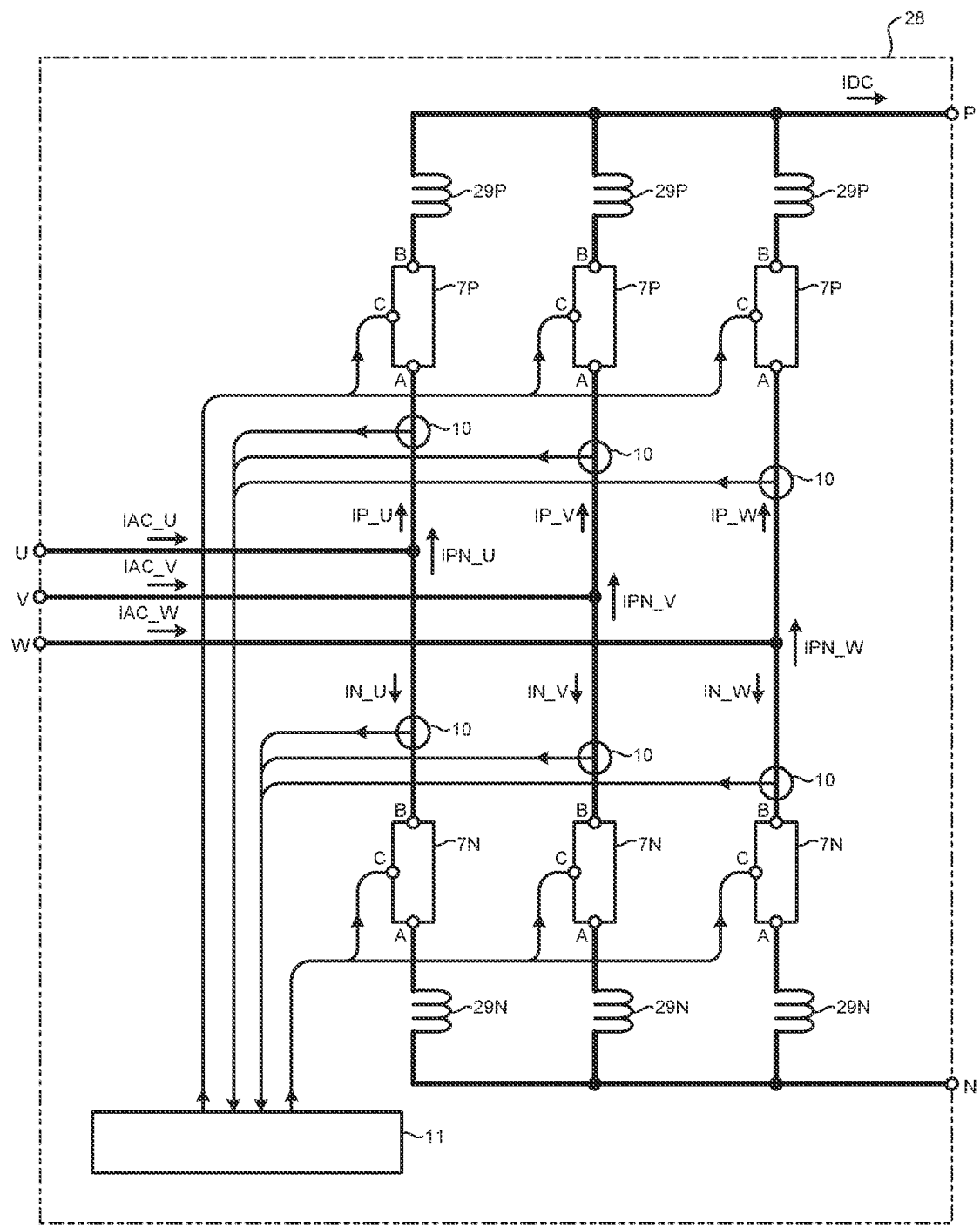
FIG. 14 is a diagram illustrating a configuration of a conventional MMC converter using two-terminal reactors.
Figure 15:
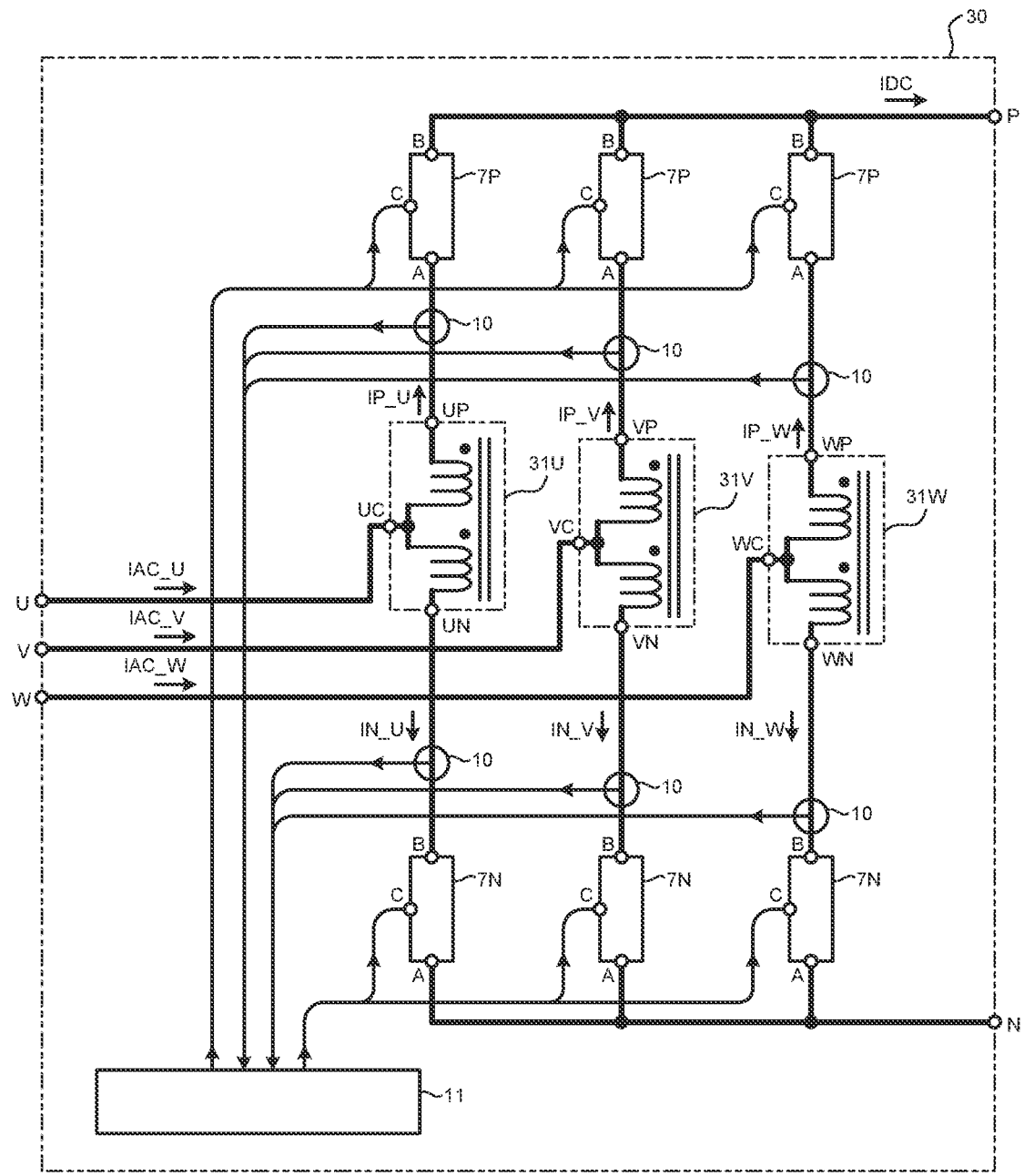
FIG. 15 is a diagram illustrating a configuration of a conventional MMC converter using three-terminal reactors.
Figure 16:
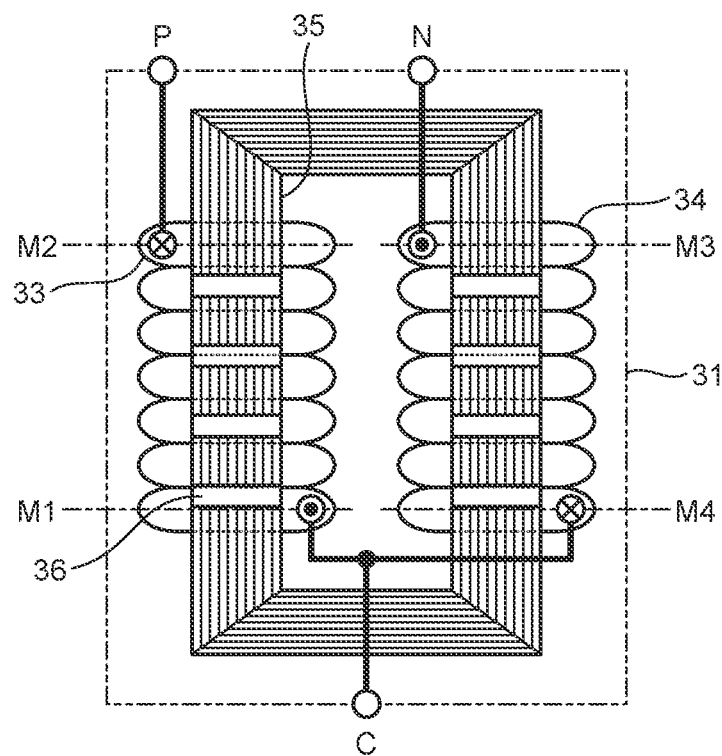
FIG. 16 is a diagram illustrating a configuration of the three-terminal reactor.
Figure 17:
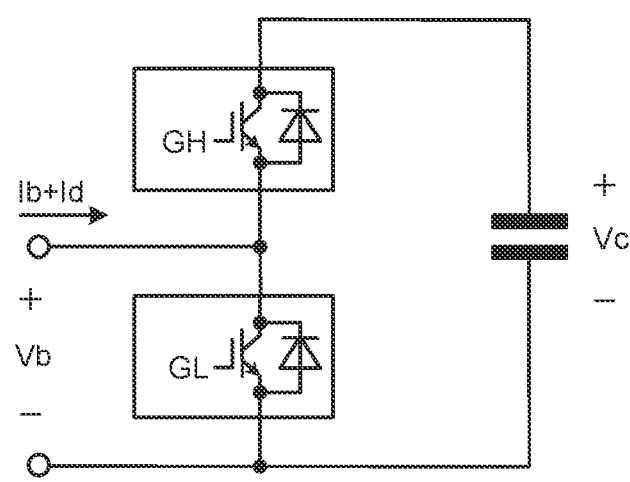
FIG. 17 is a diagram illustrating a circuit of a unit converter.
Figure 18:
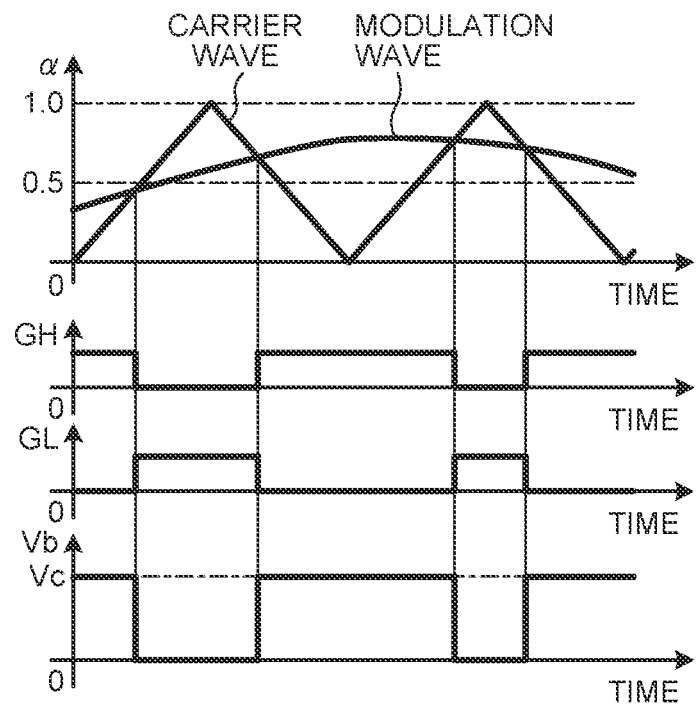
FIG. 18 are diagram for explaining a PWM control method for the unit converter.
Figure 19:
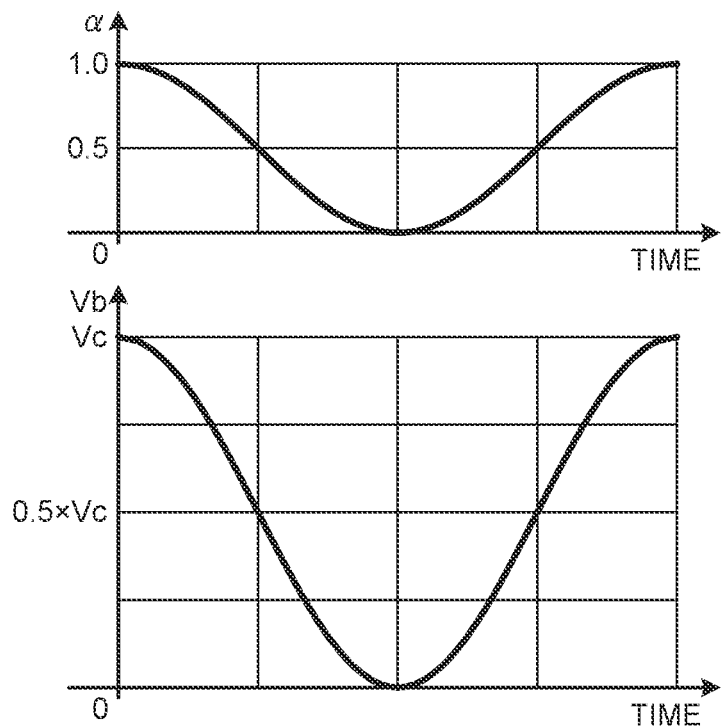
FIG. 19 are diagrams illustrating a relation between an output voltage and a modulation factor of the unit converter.
Figure 20:
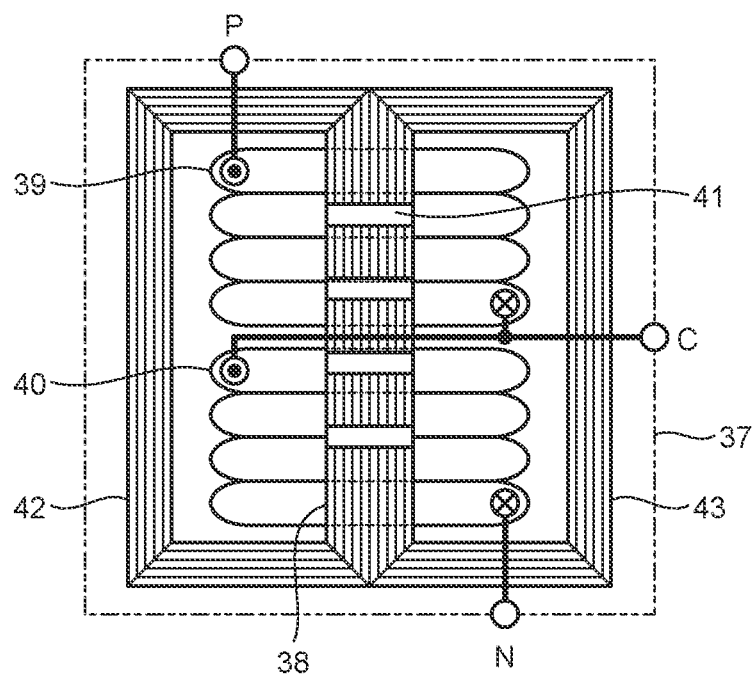
FIG. 20 is a diagram illustrating a three-terminal reactor with a structure in which an intermediate terminal of a two-terminal reactor using a shell-type iron core is led out.

FIG. 1 is a diagram illustrating a circuit configuration of a modular multilevel converter (hereinafter, "MMC converter") according to a first embodiment of the present invention. In FIG. 1, constituent elements common to the MMC converter 28 illustrated in FIG. 14 and the MMC converter 30 illustrated in FIG. 15 both described above are denoted by the same reference signs as those for the MMC converters 28 and 30. Descriptions of the constituent elements common to the MMC converters 28 and 30 are omitted to avoid redundant explanations.

In an MMC converter 1, three-terminal iron-core reactors (hereinafter, "three-terminal reactors") 2U, 2V, and 2W are provided for respective AC phases.

A U-phase configuration is described below. A P-side coil 3U is wound around an iron core 5U on the inner side in a clockwise direction, while an N-side coil 4U is wound around the iron core 5U on the outer side in a counterclockwise direction. The iron core 5U is provided with a plurality of gaps 6U of a non-magnetic material.

In a V-phase configuration, a P-side coil 3V, an N-side coil 4V, an iron core 5V, and gaps 6V are identical to those in the U-phase configuration. In a W-phase configuration, a P-side coil 3W, an N-side coil 4W, an iron core 5W, and gaps 6W are identical to those in the U-phase configuration.

A UC terminal, a VC terminal, and a WC terminal of the three-terminal reactors 2U, 2V, and 2W are connected to AC terminals U, V, and W.

Each of an arm 7P and an arm 7N has two terminals, in which unit converters are connected in series. First terminals A of three units of positive-side arms 7P are connected to a UP terminal, a VP terminal, and a WP terminal of the three-terminal reactors 2U, 2V, and 2W. Second terminals B of the positive-side arms 7P are connected in a star configuration to a positive-side terminal P of the MMC converter 1. Second terminals B of the remaining three units of negative-side arms 7N are connected to a UN terminal, a VN terminal, and a WN terminal of the three-terminal reactors 2U, 2V, and 2W. First terminals A of the negative-side arms 7N are connected in a star configuration to a negative-side terminal N of the MMC converter 1.

At the positive-side terminal P of the MMC converter 1, the potential is fixed by an earthed circuit formed of a high resistance 8P and a current transformer 9P and serving also as a DC voltage transformer. At the negative-side terminal N of the MMC converter 1, the potential is fixed by an earthed circuit formed of a high resistance 8N and a current transformer 9N and serving also as a DC voltage transformer. Due to this configuration, there are effects where a potential to ground of the neutral point of the AC terminals (U, V, and W) is reduced, and where a potential to ground of the iron cores 5U, 5V, and 5W of the three-terminal reactors 2U, 2V, and 2W is reduced.

Current transformers 10 detect currents (IP_U, IP_V, IP_W, IN_U, IN_V, and IN_W) of six coils forming the three-terminal reactors 2U, 2V, and 2W, and output the detected currents to a converter-current control device 11.

Figure 2:
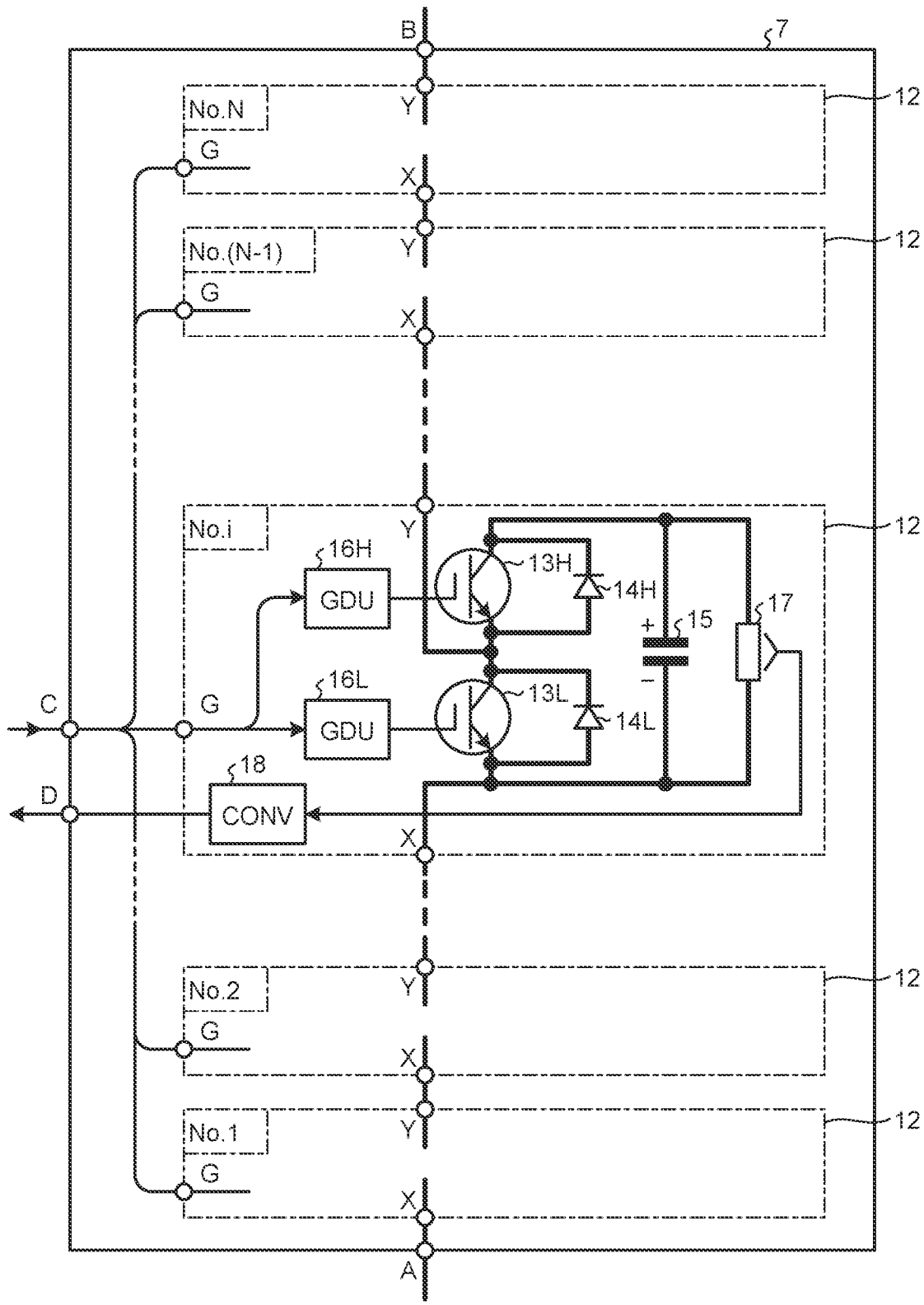
FIG. 2 is a diagram illustrating a circuit configuration of an arm (positive-side arms and negative-side arms).

FIG. 2 is a diagram illustrating a circuit configuration of the arm 7 (the positive-side arms 7P and the negative-side arms 7N).

The arm 7 is of a configuration in which N (N is a natural number) half-bridge circuits 12, each of which constitutes a unit converter, are connected in series between the first terminal A and the second terminal B. FIG. 2 omits illustrations of the circuit configuration of the half-bridge circuits 12 except for the half-bridge circuit 12 numbered "No. i".

The half-bridge circuit 12 includes two terminals, a positive-side terminal Y and a negative-side terminal X, in which self-arc-extinguishing elements 13H and 13L and inverse parallel diodes 14H and 14L, forming a bidirectional chopper circuit, are connected to a capacitor 15.

The half-bridge circuit 12 executes PWM control on the basis of a command from the converter-current control device 11 so as to output a target voltage between the X and Y terminals in accordance with an arc ignition/extinction command from gate drive units (GDU) 16H and 16L to the self-arc-extinguishing elements 13H and 13L.

A voltage detector 17 inputs a voltage of the capacitor 15 to the converter-current control device 11 via a signal converter (CONV) 18.

In the MMC converter 1 according to the first embodiment described above, the three-terminal reactors 2U, 2V, and 2W can be located in a distributed manner, so that layout flexibility of the MMC converter 1 can be ensured.

Second Embodiment

Figure 3:
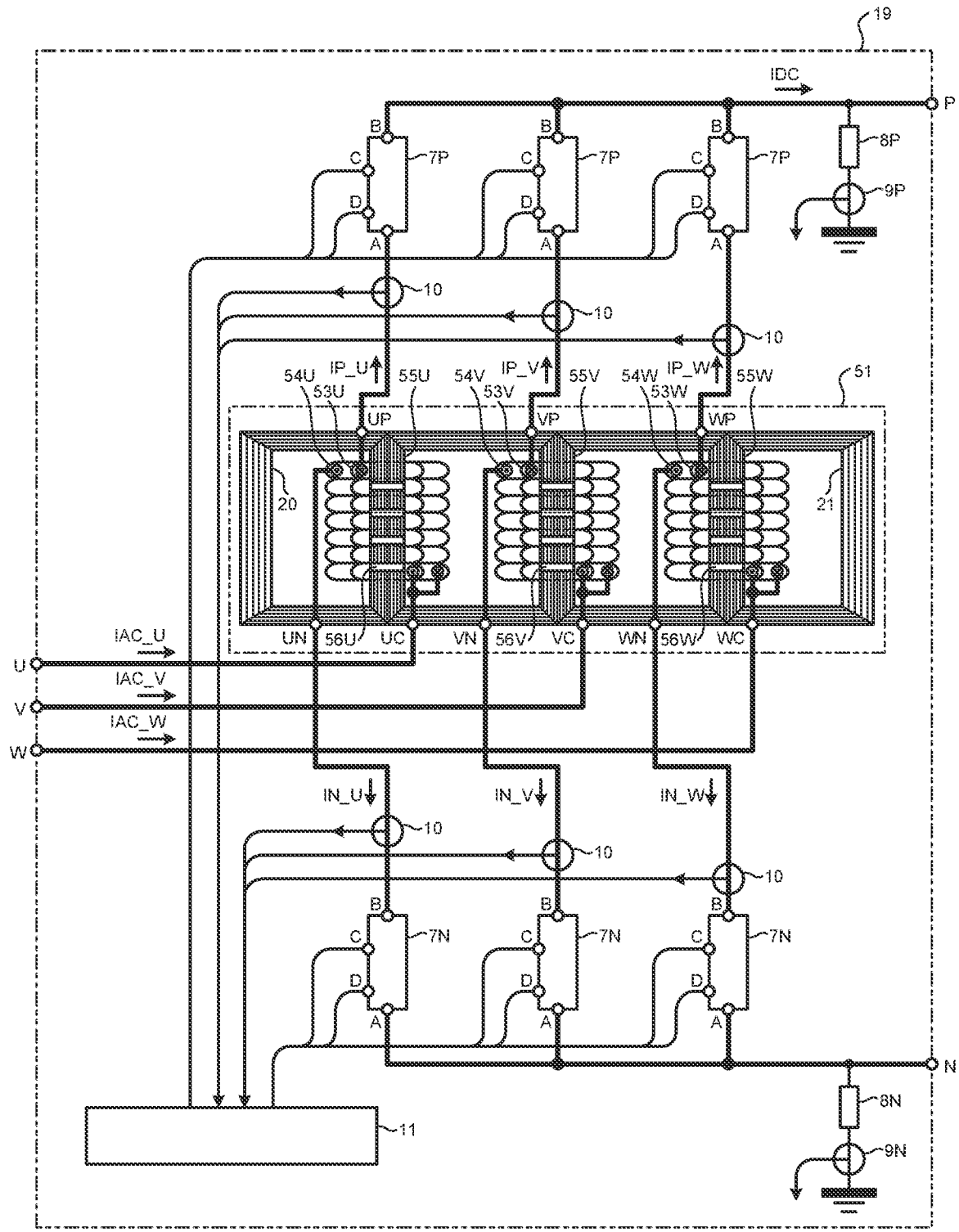
FIG. 3 is a diagram illustrating a circuit configuration of a modular multilevel converter according to a second embodiment of the present invention.

FIG. 3 is a diagram illustrating a circuit configuration of an MMC converter according to a second embodiment of the present invention. In FIG. 3, constituent elements common to the MMC converter 1 according to the first embodiment illustrated in FIG. 1 are denoted by like reference signs as those for the MMC converter 1. Descriptions of the constituent elements common to those of the MMC converter 1 are omitted to avoid redundant explanations.

An MMC converter 19 includes a three-phase five-leg iron-core reactor 51.

A U-phase P-side coil 53U is wound around a U-phase iron core 55U serving as a first leg on the inner side in a clockwise direction, while a U-phase N-side coil 54U is wound around the U-phase iron core 55U on the outer side in a counterclockwise direction. The U-phase iron core 55U is provided with a plurality of gaps 56U of a non-magnetic material.

In the V-phase configuration, a P-side coil 53V, an N-side coil 54V, an iron core 55V serving as a second leg, and gaps 56V are identical to those in the U-phase configuration. In the W-phase configuration, a P-side coil 53W, an N-side coil 54W, an iron core 55W serving as a third leg, and gaps 56W are identical to those in the U-phase configuration.

An iron core 20 serves as a fourth leg. An iron core 21 serves as a fifth leg. A zero-phase flux is generated by a magnetomotive force produced by a current passing through coils wound around the first leg to the third leg. The zero-phase flux is divided equally into two and flows through the iron core 20 as the fourth leg and the iron core 21 as the fifth leg.

A UC terminal, a VC terminal, and a WC terminal of the three-phase five-leg iron-core reactor 51 are connected to the AC terminals U, V, and W.

Each of an arm 7P and an arm 7N has two terminals, in which unit converters are connected in series. First terminals A of three units of positive-side arms 7P are connected to a UP terminal, a VP terminal, and a WP terminal of the three-phase five-leg iron-core reactor 51. Second terminals B of the positive-side arms 7P are connected in a star configuration to a positive-side terminal P of the MMC converter 19. Second terminals B of the remaining three units of negative-side arms 7N are connected to a UN terminal, a VN terminal, and a WN terminal of the three-phase five-leg iron-core reactor 51. First terminals A of the negative-side arms 7N are connected in a star configuration to a negative-side terminal N of the MMC converter 19.

In the MMC converter 19 according to the second embodiment described above, reactors for respective phases can be combined into a single unit that is the three-phase five-leg iron-core reactor 51, so that the MMC converter 19 can be downsized.

Third Embodiment

Figure 4:
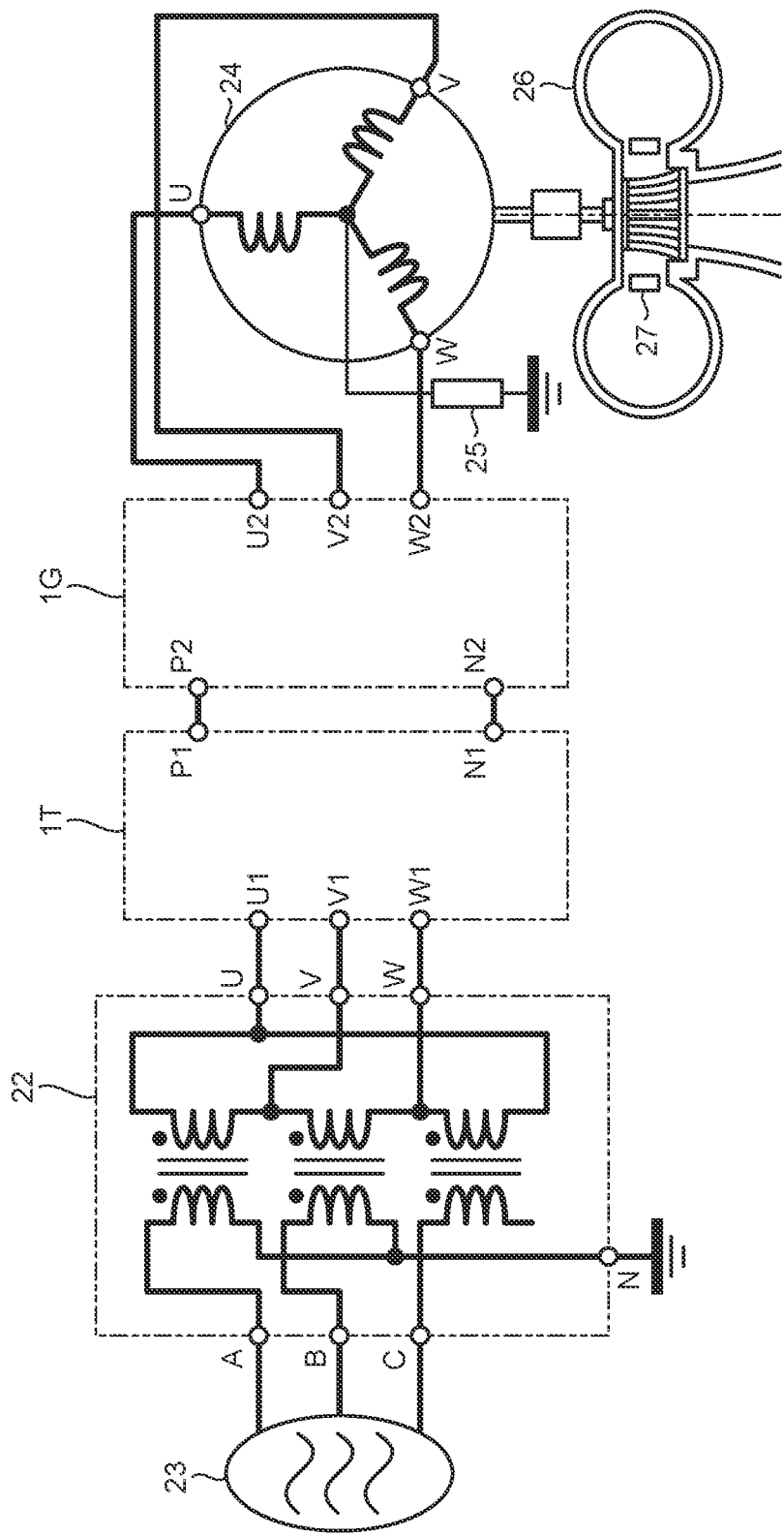
FIG. 4 is a diagram illustrating a modular multilevel converter system according to a third embodiment.

FIG. 4 is a diagram illustrating a modular multilevel converter system according to a third embodiment. FIG. 4 illustrates a circuit configuration in a case where the MMC converter according to the first embodiment or the MMC converter according to the second embodiment is applied to a variable-speed generator-motor device.

A first MMC converter 1T and a second MMC converter 1G are connected back to back on the DC side of these two units. AC terminals (U1, V1, and W1) of the first MMC converter 1T are connected to three terminals (U, V, and W) of delta-connected windings of a unit transformer 22. A neutral terminal N of star-connected windings of the unit transformer 22 is directly earthed, and three terminals (A, B, and C) of the star-connected windings are connected to an AC system 23.

AC terminals (U2, V2, and W2) of the second MMC converter 1G are connected to three-phase AC terminals (U, V, and W) of an AC electric rotating machine 24. An armature neutral point of the AC electric rotating machine 24 is earthed through a high resistance 25.

In the third embodiment in FIG. 4, a pump turbine 26 is directly connected to a rotational shaft of the AC electric rotating machine 24. The pump turbine 26 has a function of controlling opening/closing of a guide blade 27. The second MMC converter 1G outputs an alternating current with a variable frequency to thereby achieve variable-speed operation of the pump turbine 26.

Figure 5:
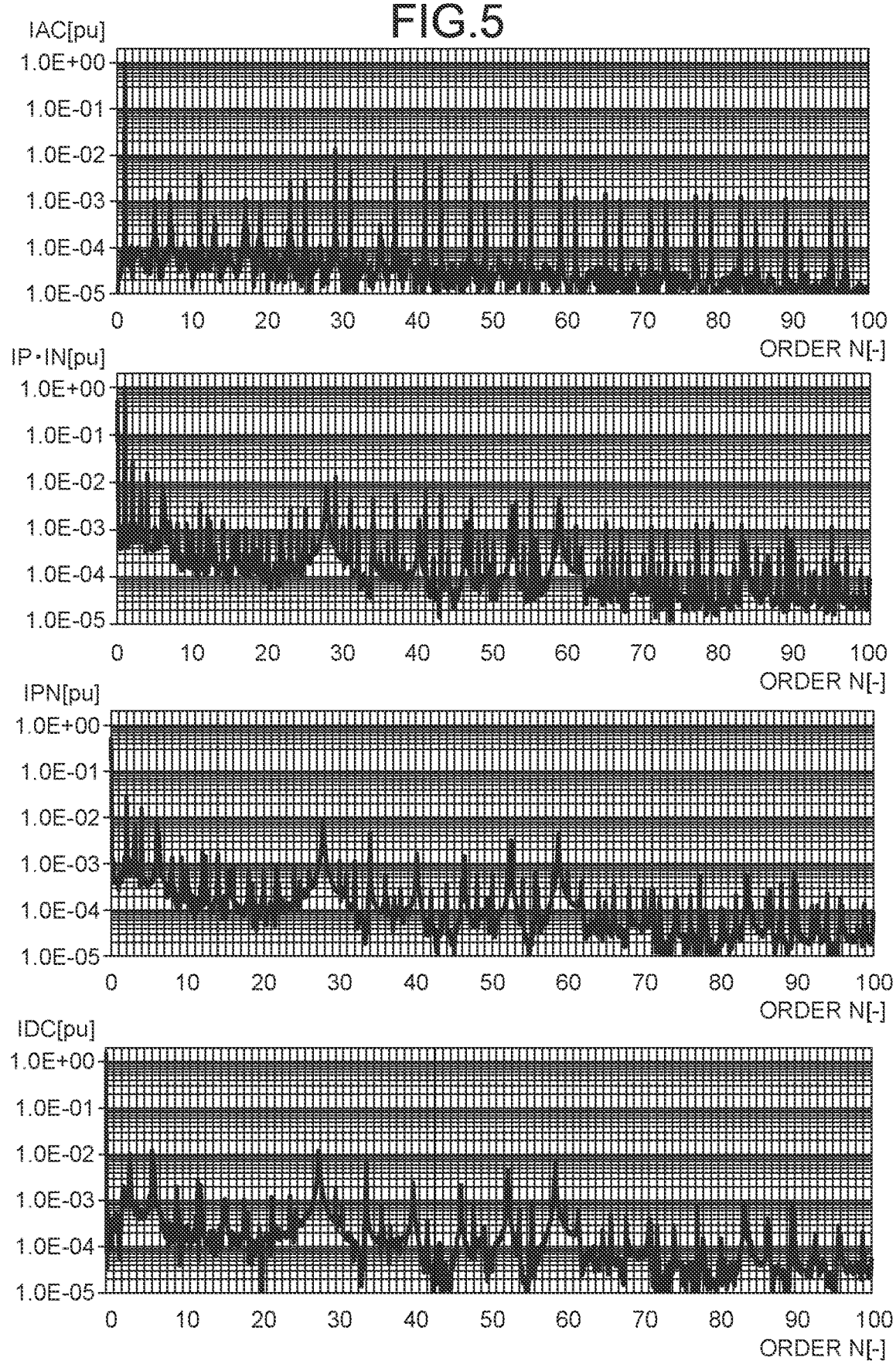
FIG. 5 are diagrams illustrating harmonics of a current at each section of the modular multilevel converter system according to the third embodiment illustrated in FIG. 4.

FIG. 5 are diagrams illustrating harmonics of a current at each section of the modular multilevel converter system according to the third embodiment illustrated in FIG. 4. FIG. 5 illustrate current harmonics during operation with the rated active power and rated power factor of 0.85 (reactive power supply) of the first MMC converter 1T. The steady operation is evaluated on the basis of the current harmonics.

The first diagram from the top in FIG. 5 illustrates an average root-mean-square value of the arm currents (IP_U, IP_V, IP_W, IN_U, IN_V, and IN_W) illustrated in FIGS. 1 and 3, which is displayed with reference to the root-mean-square value at the fundamental (n=1). The second diagram from the top of FIG. 5 illustrates an average root-mean-square value of the AC currents (IAC_U, IAC_V, and IAC_W) illustrated in FIGS. 1 and 3, which is displayed with reference to the root-mean-square value at the fundamental (n=1). The third diagram from the top in FIG. 5 illustrates an average root-mean-square value of the flow-through currents for respective phases (IPN_U, IPN_V, and IPN_W), which is displayed with reference to the root-mean-square value of the arm-current fundamental (n=1), that is, with reference to one-half of the AC-current fundamental. The fourth diagram from the top in FIG. 5 illustrates a root-mean-square value of each-order harmonic of the DC current (IDC) illustrated in FIGS. 1 and 3, which is displayed with reference to the root-mean-square value at the arm-current fundamental (n=1).

When the positive-side arm currents (IP_U, IP_V, and IP_W) and the negative-side arm currents (IN_U, IN_V, and IN_W) are compared with the AC currents (IAC_U, IAC_V, and IAC_W), the fundamental arm currents flowing through the upper and lower arms merge into an AC current, and in addition, over half of the odd-order-harmonic arm currents become an AC current. In contrast, the even-order-harmonic arm currents, considered to be harmful particularly for the system, do not flow out toward the AC-current side. Although it is harmful if even-order-harmonic currents flow out to the system, the second-order harmonic current is still essential to maintain an average voltage by charging/discharging the capacitor 15 that constitutes the unit converter.

When the flow-through currents (IPN_U, IPN_V, and IPN_W) are compared with the DC current (IDC), a total of DC components of the flow-through currents for three phases is equal to a DC component of the DC current (IDC). The amplitude (root-mean-square value) of the DC current (IDC) is three times as large as that of the flow-through current.

In contrast, the amplitude of odd-order harmonics of the DC current (IDC) is 1.5 times as large as that of the flow-through current. The ratio of amplitude of the odd-order harmonics to the flow-through current is reduced to one-half of the ratio of amplitude of the DC component to the flow-through current.

Zero-phase magnetomotive forces of the second harmonic and the fourth harmonic, which are the largest among the even-order harmonics of the DC current (IDC), cancel each other out to zero. The amplitude of the other even-order harmonics becomes equivalent (1.0 times) to that of the flow-through current. The ratio of amplitude of the other even-order harmonics to the flow-through current is reduced to one-third of the ratio of the amplitude of the DC component to the flow-through current.

In the MMC converter 19 illustrated in FIG. 3, the rate of increase in iron loss due to harmonic components of the fourth leg and the fifth leg of the three-phase five-leg iron-core reactor 51 is lower than that of the first leg, the second leg, and the third leg.

In view of the above, the thickness of a laminated electromagnetic steel plate of the iron core 20 as the fourth leg and the iron core 21 as the fifth leg of the three-phase five-leg iron-core reactor 51 in the MMC converter 19 can be increased. This increases the effective cross-sectional area of the magnetic path. Thus, as compared to the case where three units of three-terminal reactors are provided for respective phases, the three-phase five-leg iron-core reactor 51 has an effect where the loss is decreased because a total cross-sectional area of the iron core 55U as the first leg, the iron core 55V as the second leg, and the iron core 55W as the third leg is equal to a total cross-sectional area of the iron core 20 as the fourth leg and the iron core 21 as the fifth leg, and also the same materials are used.

As illustrated in FIG. 3, the gaps 56U, 56V, and 56W are provided to reduce magnetic saturation in the iron core 55U as the first leg, the iron core 55V as the second leg, and the iron core 55W as the third leg of the three-phase five-leg iron-core reactor 51, while the other iron cores including the iron core 20 as the fourth leg and the iron core 21 as the fifth leg are not provided with a gap. Due to this configuration, flux leakage can be decreased, and the current transformers 10 using a Hall element that is more likely to be affected by the surrounding magnetic field can be installed near the three-phase five-leg iron-core reactor 51, so that downsizing of the device can be achieved. Magnetic shield facilities for the three-phase five-leg iron-core reactor 51 can be reduced in size.

The steady operation state has been evaluated by means of harmonics analyzation in the manner described above. In a case where a variable-speed generator-motor device is connected to a trunk power system, it is important to evaluate the operational state during the transient period. Especially, it is important to ensure the operational reliability in the transient state when the system is being affected by a ground fault. In a case where the AC electric rotating machine 24 is directly connected to a variable-speed pump turbine, the transient phenomenon differs significantly between a pumping mode in which active power is supplied from the AC system 23 and a power generation mode in which active power is supplied to the AC system 23. A ground fault mode that occurs in the AC system differs between a case of a symmetric accident and a case of an asymmetric accident.

A case where a symmetric accident has occurred in a power generation mode, and a case where an asymmetric accident has occurred in a pumping mode are selected as a typical example. The operational state in either selected case is described. Hereinafter, the operational state is described using an example with numerical values in which the MMC converter 1T with 60 MVA-15.4 kV is connected to the AC system 23 with 500 kV through the unit transformer 22.

FIG. 6 is an explanatory diagram when a symmetric accident has occurred in an AC system 23A during operation of the MMC converter system according to the third embodiment illustrated in FIG. 4 with ratings in a power generation mode (60 MVA, 15.4 kV, and power factor of 0.85). Like constituent elements to those illustrated in FIG. 4 are denoted by like reference signs, and descriptions thereof are omitted to avoid redundant explanations.

In a case illustrated in FIG. 6, a ground fault occurs at a time t1 on first lines (1A, 1B, and 1C) of the AC system formed of two power transmission lines, and thus earthed circuits 73 are closed. Sequentially, breakers 52 are opened at a time t2. A transient phenomenon at each section at this time is illustrated in FIGS. 7, 8, and 9.

FIG. 7 illustrate voltage and current waveforms of the unit transformer 22. The upper diagram in FIG. 7 illustrates voltages (V_AN, V_BN, and V_CN) of the unit transformer 22 closer to the AC system. The lower diagram in FIG. 7 illustrates currents (IAC_U, IAC_V, and IAC_W) of the unit transformer 22 closer to the MMC converter 1T.

FIG. 8 illustrate arm-current waveforms of the MMC converter 1T. The upper diagram in FIG. 8 illustrates the positive-side arm currents (IP_U, IP_V, and IP_W), while the lower diagram in FIG. 8 illustrates the negative-side arm currents (IN_U, IN_V, and IN_W). The peak value of the arm current reaches a value that is approximately 1.4 times as large as the steady-state value.

The upper diagram in FIG. 9 illustrates waveforms of the flow-through currents (IPN_U, IPN_V, and IPN_W) in the MMC converter 1T, while the lower diagram in FIG. 9 illustrates waveforms of the DC current (IDC). The peak value of the flow-through current is approximately equal to the steady-state value, and the peak value of the DC current is also approximately equal to the steady-state value.

FIG. 10 is an explanatory diagram when an asymmetric accident has occurred in an AC system 23B during operation of the MMC converter system according to the third embodiment illustrated in FIG. 4 with ratings in a pumping mode (60 MVA, 15.4 kV, and power factor of 0.85). Like constituent elements to those illustrated in FIG. 4 are denoted by like reference signs, and descriptions thereof are omitted to avoid redundant explanations.

In a case illustrated in FIG. 10, a ground fault occurs at the time t1 on the first line (1A) for one phase and a second line (2A) for the same phase as the first line (1A) in the AC system formed of two power transmission lines, and thus the earthed circuits 73 are closed. Sequentially, the breakers 52 are opened at the time t2. At the time t2, an A-phase is opened, and thus open-phase operation is performed by a B-phase and a C-phase. A transient phenomenon at each section in this case is illustrated in FIGS. 11, 12, and 13.

FIG. 11 illustrate voltage and current waveforms of the unit transformer 22. The upper diagram in FIG. 11 illustrates voltages (V_AN, V_BN, and V_CN) of the unit transformer 22 closer to the AC system. The lower diagram in FIG. 11 illustrates currents (IAC_U, IAC_V, and IAC_W) of the unit transformer 22 closer to the MMC converter 1T. At the time t2 or later, an A-phase winding of the unit transformer 22 is bought into an open state. An A-phase voltage in FIG. 11 is an induced voltage from the delta-connected windings of the unit transformer 22.

FIG. 12 illustrate arm-current waveforms in the MMC converter 1T. The upper diagram in FIG. 12 illustrates the positive-side arm currents (IP_U, IP_V, and IP_W), while the lower diagram in FIG. 12 illustrates the negative-side arm currents (IN_U, IN_V, and IN_W). The peak value of the arm current reaches a value that is approximately 1.7 times as large as the steady-state value, and is larger than the peak value at the time of a symmetric accident in FIG. 8. A phenomenon, in which a current peak value at the time of an asymmetric accident is larger than that at the time of a symmetric accident, occurs in general in MMC converters.

The upper diagram in FIG. 13 illustrates waveforms of the flow-through currents (IPN_U, IPN_V, and IPN_W) in the MMC converter 1T, while the lower diagram in FIG. 13 illustrates waveforms of the DC current (IDC). The peak value of the flow-through current is significantly reduced to a value that is smaller relative to the peak value of the arm current (that is approximately 1.7 times as large as the steady-state value). The peak value of the flow-through current is 1.05 times as large as the steady-state value. The peak value of the DC current is 1.1 times as large as the steady-state value. Both the peak value of the flow-through current and the peak value of the DC current are larger than their corresponding peak values at the time of a symmetric accident in FIG. 9.

As described above, when three units of three-terminal reactors 2 are used, AC components of the magnetomotive forces cancel each other out, thereby resulting in a peak value of the magnetomotive force being equal to or smaller than one-third relative to the case where six units of the two-terminal reactors 29 are used, in each of which an arm current produces a magnetomotive force. Therefore, downsizing of the device can be achieved. Because magnification of the peak value of the magnetomotive force when the system is being affected by an accident can be significantly decreased, iron-core saturation can be more easily reduced. Therefore, further downsizing of the device can be achieved.

Furthermore, zero-phase harmonics can be reduced by employing the three-phase five-leg iron-core reactor 51, as compared to the case where three units of the three-terminal reactors 2 are used, so that a further downsized, lower-loss device can be obtained.

REFERENCE SIGNS LIST 1, 1T, 1G, 19, 28, 30 MMC converter
2U, 2V, 2W, 31, 31U, 31V, 31W, 37 three-terminal iron-core reactor
3U, 3V, 3W, 53U, 53V, 53W P-side coil
4U, 4V, 4W, 54U, 54V, 54W N-side coil
5U, 5V, 5W, 20, 21, 38, 42, 43, 55U, 55V, 55W iron core
6U, 6V, 6W, 36, 41, 56U, 56V, 56W gap
7 arm
7P positive-side arm
7N negative-side arm
8P, 8N, 25 high resistance
9P, 9N, 10 current transformer
11 converter-current control device
12 half-bridge circuit
13H, 13L self-arc-extinguishing element
14H, 14L inverse parallel diode
15 capacitor
16H, 16L gate drive unit
17 voltage detector
18 signal converter
22 unit transformer
23, 23A, 23B AC system
24 AC electric rotating machine
26 pump turbine
27 guide blade
29 two-terminal reactor
33, 34, 39, 40 winding (reactor coil)
51 three-phase five-leg iron-core reactor
52 breaker

The invention claimed is:

1. A modular multilevel converter connected between a positive-side terminal (P terminal) and a negative-side terminal (N terminal) of a DC power supply, and three-phase AC terminals (U terminal, V terminal, and W terminal), the modular multilevel converter comprising:
three units of two-terminal arms (UP arm, VP arm, and WP arm) between the positive-side terminal (P terminal) and the three-phase AC terminals, and three units of two-terminal arms (UN arm, VN arm, and WN arm) between the negative-side terminal (N terminal) and the three-phase AC terminals, in which in each of the two-terminal arms, k (k is a natural number equal to or larger than 1) unit converters are connected in series, each of the unit converters having two terminals and being capable of outputting any voltage through an energy storage element with voltage source properties; and
an inductive element including a two-terminal coil between three units of two-terminal arms closer to the positive-side terminal (P terminal), three units of two-terminal arms closer to the negative-side terminal (N terminal), and the three-phase AC terminals, wherein
the inductive element includes
a first reactor provided with two coils (UP coil and UN coil) concentrically wound around an iron-core leg,
a second reactor provided with two coils (VP coil and VN coil) concentrically wound around an iron-core leg, and
a third reactor provided with two coils (WP coil and WN coil) concentrically wound around an iron-core leg, and
the UP coil, the UN coil, the VP coil, the VN coil, the WP coil, and the WN coil are wound in a direction such that a first terminal of the UP coil and a second terminal of the UN coil are connected to be led out as a U terminal of the three-phase AC terminals, a first terminal of the VP coil and a second terminal of the VN coil are connected to be led out as a V terminal of the three-phase AC terminals, and a first terminal of the WP coil and a second terminal of the WN coil are connected to be led out as a W terminal of the three-phase AC terminals, then a second terminal of the UP coil is connected to a first terminal of the UP arm, a first terminal of the UN coil is connected to a second terminal of the UN arm, a second terminal of the VP coil is connected to a first terminal of the VP arm, a first terminal of the VN coil is connected to a second terminal of the VN arm, a second terminal of the WP coil is connected to a first terminal of the WP arm, and a first terminal of the WN coil is connected to a second terminal of the WN arm, and thereby an iron-core leg of the first reactor is excited by a current flowing from the UN coil to the UP coil, an iron-core leg of the second reactor is excited by a current flowing from the VN coil to the VP coil, and an iron-core leg of the third reactor is excited by a current flowing from the WN coil to the WP coil.

2. A modular multilevel converter connected between a positive-side terminal (P terminal) and a negative-side terminal (N terminal) of a DC power supply, and three-phase AC terminals (U terminal, V terminal, and W terminal), the modular multilevel converter comprising:
three units of two-terminal arms (UP arm, VP arm, and WP arm) between the positive-side terminal (P terminal) and the three-phase AC terminals, and three units of two-terminal arms (UN arm, VN arm, and WN arm) between the negative-side terminal (N terminal) and the three-phase AC terminals, in which in each of the two-terminal arms, k (k is a natural number equal to or larger than 1) unit converters are connected in series, each of the unit converters having two terminals and being capable of outputting any voltage through an energy storage element with voltage source properties; and
an inductive element including a two-terminal coil between three units of two-terminal arms closer to the positive-side terminal (P terminal), three units of two-terminal arms closer to the negative-side terminal (N terminal), and the three-phase AC terminals, wherein
the inductive element is provided with
two coils (UP coil and UN coil) concentrically wound around a first iron-core leg,
two coils (VP coil and VN coil) concentrically wound around a second iron-core leg,
two coils (WP coil and WN coil) concentrically wound around a third iron-core leg, and
a fourth iron-core leg and a fifth iron-core leg through which a common-mode flux of the first iron-core leg, the second iron-core leg, and the third iron-core leg passes, and
the UP coil, the UN coil, the VP coil, the VN coil, the WP coil, and the WN coil are wound in a direction such that a first terminal of the UP coil and a second terminal of the UN coil are connected to be led out as a U terminal of the three-phase AC terminals, a first terminal of the VP coil and a second terminal of the VN coil are connected to be led out as a V terminal of the three-phase AC terminals, and a first terminal of the WP coil and a second terminal of the WN coil are connected to be led out as a W terminal of the three-phase AC terminals, then a second terminal of the UP coil is connected to a first terminal of the UP arm, a first terminal of the UN coil is connected to a second terminal of the UN arm, a second terminal of the VP coil is connected to a first terminal of the VP arm, a first terminal of the VN coil is connected to a second terminal of the VN arm, a second terminal of the WP coil is connected to a first terminal of the WP arm, and a first terminal of the WN coil is connected to a second terminal of the WN arm, and thereby the first iron-core leg is excited by a current flowing from the UN coil to the UP coil, the second iron-core leg is excited by a current flowing from the VN coil to the VP coil, and the third iron-core leg is excited by a current flowing from the WN coil to the WP coil.

3. A modular multilevel converter system comprising two units of the modular multilevel converters according to claim 1 or 2, wherein DC positive-side terminals (P terminals) of the modular multilevel converters are connected back to back, and DC negative-side terminals (N terminals) of the modular multilevel converters are connected back to back, an AC terminal of a first modular multilevel converter is connected to a power system through a unit transformer, an AC terminal of a second modular multilevel converter is connected to an electric rotating machine, and an output frequency of the second modular multilevel converter is set variable to make a rotational speed of the electric rotating machine variable.

* * * * *